(12) United States Patent
Nagashima et al.

(10) Patent No.: US 8,252,393 B2
(45) Date of Patent: Aug. 28, 2012

(54) SURFACE-MODIFIED INORGANIC PIGMENT, COLORED SURFACE-MODIFIED INORGANIC PIGMENT, RECORDING MEDIUM AND PRODUCTION PROCESSES THEREOF, AND IMAGE FORMING METHOD AND RECORDED IMAGE

(75) Inventors: Akira Nagashima, Tokyo (JP); Kenji Nakajima, Machida (JP); Sadayuki Sugama, Tsukuba (JP); Hitoshi Yoshino, Zama (JP); Masaya Asao, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 238 days.

(21) Appl. No.: 12/516,496

(22) PCT Filed: Dec. 25, 2008

(86) PCT No.: PCT/JP2008/073931
§ 371 (c)(1),
(2), (4) Date: May 27, 2009

(87) PCT Pub. No.: WO2009/084716
PCT Pub. Date: Jul. 9, 2009

(65) Prior Publication Data
US 2011/0059298 A1    Mar. 10, 2011

(30) Foreign Application Priority Data
Dec. 28, 2007 (JP) .................................. 2007-340897

(51) Int. Cl.
*B41M 5/00* (2006.01)
(52) U.S. Cl. .................. 428/32.34; 428/32.36; 428/328; 428/689

(58) Field of Classification Search ............... 428/32.34, 428/32.36, 328, 689
See application file for complete search history.

(56) References Cited

U.S. PATENT DOCUMENTS

| | | | |
|---|---|---|---|
| 4,892,591 A | 1/1990 | Ogawa et al. | 106/482 |
| 5,041,328 A | 8/1991 | Akiya et al. | 428/212 |
| 5,078,790 A | 1/1992 | Tochihara et al. | 106/20 |
| 5,080,716 A | 1/1992 | Aoki et al. | 106/20 |
| 5,131,949 A | 7/1992 | Tochihara et al. | 106/20 |
| 5,132,700 A | 7/1992 | Tochihara et al. | 346/1.1 |
| 5,213,613 A | 5/1993 | Nagashima et al. | 106/20 R |

(Continued)

FOREIGN PATENT DOCUMENTS
EP    0275711 A1    7/1988
(Continued)

OTHER PUBLICATIONS

Jul. 8, 2010 International Preliminary Report on Patentability and Apr. 21, 2009 Written Opinion in International Patent Application No. PCT/JP2008/073931.

(Continued)

*Primary Examiner* — Betelhem Shewareged
(74) *Attorney, Agent, or Firm* — Fitzpatrick, Cella, Harper & Scinto

(57) ABSTRACT

The invention relates to a surface-modified inorganic pigment which has an inorganic pigment having acid function and an amorphous body located on the surface of the inorganic pigment having acid function and formed by at least a divalent or higher-valent metal and an anion component in a state where the inorganic pigment and the amorphous body do not chemically bond to each other, and which does not exhibit acid function.

13 Claims, 11 Drawing Sheets

U.S. PATENT DOCUMENTS

| | | | | |
|---|---|---|---|---|
| 5,258,066 A | 11/1993 | Kobayashi et al. | | 106/22 R |
| 5,260,353 A | 11/1993 | Palmer et al. | | 523/200 |
| 5,296,022 A | 3/1994 | Kobayashi et al. | | 106/20 D |
| 5,362,770 A | 11/1994 | Palmer et al. | | 523/200 |
| 5,409,529 A | 4/1995 | Nagashima et al. | | 106/22 H |
| 5,451,251 A | 9/1995 | Mafune et al. | | 106/22 H |
| 5,478,383 A | 12/1995 | Nagashima et al. | | 106/22 H |
| 5,482,545 A | 1/1996 | Aoki et al. | | 106/22 K |
| 5,571,313 A | 11/1996 | Mafune et al. | | 106/22 H |
| 5,629,129 A | 5/1997 | Yamamoto et al. | | 430/201 |
| 5,635,291 A | 6/1997 | Yoshino et al. | | 428/304.4 |
| 5,679,451 A | 10/1997 | Kondo et al. | | 428/304.4 |
| 5,707,716 A | 1/1998 | Yoshino et al. | | 428/212 |
| 5,733,363 A | 3/1998 | Nagashima et al. | | 106/31.43 |
| 5,738,932 A | 4/1998 | Kondo et al. | | 428/195 |
| 5,800,916 A | 9/1998 | Yoshino et al. | | 428/328 |
| 5,804,320 A | 9/1998 | Tomioka et al. | | 428/478.2 |
| 5,846,647 A | 12/1998 | Yoshino et al. | | 428/328 |
| 5,851,654 A | 12/1998 | Yoshino et al. | | 428/328 |
| 5,865,883 A | 2/1999 | Teraoka et al. | | 106/31.32 |
| 5,869,177 A | 2/1999 | Yoshino et al. | | 428/328 |
| 5,936,649 A | 8/1999 | Ikeda et al. | | 347/87 |
| 5,955,142 A | 9/1999 | Yoshino et al. | | 427/205 |
| 5,955,185 A | 9/1999 | Yoshino et al. | | 428/304.4 |
| 5,962,124 A | 10/1999 | Yoshino et al. | | 428/328 |
| 5,965,252 A | 10/1999 | Santo et al. | | 428/329 |
| 6,000,794 A | 12/1999 | Kondo et al. | | 347/105 |
| 6,156,419 A | 12/2000 | Brugger et al. | | 428/304.4 |
| 6,177,188 B1 | 1/2001 | Ichioka et al. | | 428/342 |
| 6,342,289 B1 | 1/2002 | Eguchi et al. | | 428/195 |
| 6,387,516 B1 | 5/2002 | Koitabashi et al. | | 106/31.6 |
| 6,391,440 B1 | 5/2002 | Yoshino et al. | | 428/342 |
| 6,558,740 B1 | 5/2003 | Santo et al. | | 427/146 |
| 6,576,324 B2 | 6/2003 | Yoshino et al. | | 428/195 |
| 6,649,661 B2 | 11/2003 | Yoshino et al. | | 516/93 |
| 6,676,254 B2 | 1/2004 | Nagashima et al. | | 347/100 |
| 6,706,340 B2 | 3/2004 | Yoshino et al. | | 428/32.21 |
| 6,716,495 B1 | 4/2004 | Yoshino et al. | | 428/32.16 |
| 6,720,041 B2 | 4/2004 | Yoshino et al. | | 428/32.24 |
| 6,875,720 B2 | 4/2005 | Van Berge et al. | | 502/103 |
| 6,945,646 B2 | 9/2005 | Ogino et al. | | 347/105 |
| 7,125,111 B2 | 10/2006 | Udagawa et al. | | 347/100 |
| 7,128,779 B2 | 10/2006 | Osumi et al. | | 106/31.52 |
| 7,141,105 B2 | 11/2006 | Udagawa et al. | | 106/31.49 |
| 7,144,449 B2 | 12/2006 | Udagawa et al. | | 106/31.15 |
| 7,144,613 B2 | 12/2006 | Eguchi et al. | | 428/32.37 |
| 7,185,978 B2 | 3/2007 | Nagashima et al. | | 347/100 |
| 7,195,340 B2 | 3/2007 | Nagashima et al. | | 347/56 |
| 7,195,665 B2 | 3/2007 | Osumi et al. | | 106/31.47 |
| 7,267,716 B2 | 9/2007 | Nagashima et al. | | 106/31.6 |
| 7,276,110 B2 | 10/2007 | Tsujimura et al. | | 106/31.27 |
| 7,276,112 B2 | 10/2007 | Tokuda et al. | | 106/31.6 |
| 7,282,090 B2 | 10/2007 | Osumi et al. | | 106/31.47 |
| 7,291,211 B2 | 11/2007 | Kaneko et al. | | 106/31.27 |
| 7,297,199 B2 | 11/2007 | Osumi et al. | | 106/31.5 |
| 7,297,203 B2 | 11/2007 | Takada et al. | | 106/31.8 |
| 7,303,620 B2 | 12/2007 | Nagashima et al. | | 106/31.6 |
| 7,347,890 B2 | 3/2008 | Nito et al. | | 106/31.27 |
| 7,364,770 B2 | 4/2008 | Nagashima et al. | | 427/215 |
| 7,374,606 B2 | 5/2008 | Sato et al. | | 106/31.27 |
| 7,374,728 B2 | 5/2008 | Nakanishi et al. | | 422/177 |
| 7,377,631 B2 | 5/2008 | Takada et al. | | 347/100 |
| 7,402,200 B2 | 7/2008 | Imai et al. | | 106/31.27 |
| 7,416,639 B2 | 8/2008 | Yoshino et al. | | 162/181.4 |
| 7,429,291 B2 | 9/2008 | Udagawa et al. | | 106/31.15 |
| 7,445,325 B2 | 11/2008 | Aikawa et al. | | 347/100 |
| 7,455,400 B2 | 11/2008 | Nagashima et al. | | 347/100 |
| 7,464,965 B2 | 12/2008 | Udagawa et al. | | 283/92 |
| 7,473,437 B2 | 1/2009 | Nagashima et al. | | 427/261 |
| 7,578,876 B2 | 8/2009 | Nakajima et al. | | 106/31.65 |
| 2001/0009712 A1* | 7/2001 | Totani et al. | | 428/195 |
| 2004/0161554 A1* | 8/2004 | Suda et al. | | 428/32.1 |
| 2005/0204955 A1 | 9/2005 | Nagashima et al. | | 106/31.59 |
| 2006/0078697 A1 | 4/2006 | Yoshino | | 428/32.34 |
| 2006/0098068 A1 | 5/2006 | Hakamada et al. | | 347/100 |
| 2006/0103704 A1 | 5/2006 | Hakamada et al. | | 347/100 |
| 2006/0120932 A1* | 6/2006 | Takemura et al. | | 423/111 |
| 2006/0194897 A1 | 8/2006 | Kawabe et al. | | 523/160 |
| 2007/0013761 A1 | 1/2007 | Yoshino et al. | | 347/105 |
| 2009/0078889 A1 | 3/2009 | Udagawa et al. | | 250/492.1 |

FOREIGN PATENT DOCUMENTS

| | | |
|---|---|---|
| JP | 55-53591 | 4/1980 |
| JP | 55-150396 | 11/1980 |
| JP | 58-94491 | 6/1983 |
| JP | 59-96988 | 6/1984 |
| JP | 61-43593 | 3/1986 |
| JP | 61-57379 | 3/1986 |
| JP | 61-57380 | 3/1986 |
| JP | 61-63477 | 4/1986 |
| JP | 63-166586 | 7/1988 |
| JP | 63-306074 | 12/1988 |
| JP | 1-258980 | 10/1989 |
| JP | 1-259982 | 10/1989 |
| JP | 3-218887 | 9/1991 |
| JP | 4-323075 | 11/1992 |
| JP | 5-16015 | 1/1993 |
| JP | 5-202190 | 8/1993 |
| JP | 6-220251 | 8/1994 |
| JP | 62-20251 | 8/1994 |
| JP | 7-196308 | 8/1995 |
| JP | 7-232473 | 9/1995 |
| JP | 8-132731 | 5/1996 |
| JP | 8-164664 | 6/1996 |
| JP | 9-66664 | 3/1997 |
| JP | 9-76628 | 3/1997 |
| JP | 10-329404 | 12/1998 |
| JP | 2003-514699 | 4/2003 |
| JP | 2004-504136 | 2/2004 |
| JP | 2004-306019 | 11/2004 |
| WO | 2009/084710 A1 | 7/2009 |

OTHER PUBLICATIONS

Jun. 15, 2009 Communication with Informal Comments in International Application No. PCT/JP2008/073931.

Rocek J., et al., "Porous structure of aluminum hydroxide and its content of pseudoboehmite," *Applied Catalysis*, vol. 74, pp. 29-36 (1991).

Mar. 21, 2012 European Search Report in European Patent Appln. No. 08866156.6.

\* cited by examiner

FIG. 19
| | EX. D-1 | EX. E-1 | EX. F-1 | EX. H-1 | EX. B-3 | Comp. EX. B-4 |
|---|---|---|---|---|---|---|
| Ini |  |  |  |  |  |  |
| After exposure to ozone | 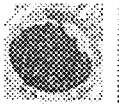 |  |  |  |  |  |
FIG. 20
| | EX. M-1 | Comp. EX. M-1 |
|---|---|---|
| Ini | 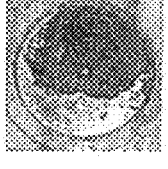 | 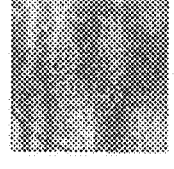 |
| After exposure to ozone | 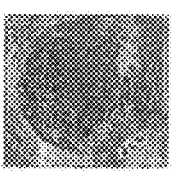 | 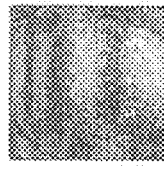 |

SURFACE-MODIFIED INORGANIC PIGMENT, COLORED SURFACE-MODIFIED INORGANIC PIGMENT, RECORDING MEDIUM AND PRODUCTION PROCESSES THEREOF, AND IMAGE FORMING METHOD AND RECORDED IMAGE

TECHNICAL FIELD

The present invention relates a surface-activity-modified inorganic pigment and a production process of the surface-modified inorganic pigment. The present invention also relates to a recording medium using the surface-modified inorganic pigment, which can be applied to fields of various information/image recording applications, such as an ink jet recording system, an offset printing system and a sublimate type thermal ink-transfer system, a production process of the recording medium, and an image forming method and a recorded image using the recording medium.

More particularly, the present invention relates to a surface-modified inorganic pigment obtained by changing the surface activity of an inorganic pigment having acid function so as substantially not to exhibit its acid function and to have excellent capability to decompose organic compounds, and a production process thereof. Further, the present invention relates to a recording medium obtained by using the surface-modified inorganic pigment in a coloring-material-receiving layer of a recording medium and thereby obtaining good fastness properties of a coloring agent upon coloring by an ink jet recording system, offset printing system or sublimate type thermal ink-transfer system, and a production process of the recording medium. The present invention also relates to an image forming method and a recorded image using the recording medium.

BACKGROUND ART

In ink jet recording greatly spread in market in recent years in particular, many technical approaches and proposals have been disclosed in recording media for the purpose of achieving coloring ability and image fastness equivalent or superior to those of a silver halide photograph. Among these, there have been lots of proposals for causing a metal ion or metal salt to coexist in an ink-receiving layer in addition to ink-receiving materials for the purpose of improving the fastness properties of the resulting recorded image.

For example, proposals of a recording medium obtained by overcoating an ink-receiving layer with a liquid medium containing a metal ion or metal salt dissolved therein include the following proposals. Japanese Patent Application Laid-Open No. S55-053591 discloses recording paper obtained by post-coating a recording surface of a recording medium with an aqueous solution of a water-soluble metal salt for the purpose of improving the water resistance of the resulting recorded image. Japanese Patent Application Laid-Open No. S55-150396 discloses recording paper obtained by post-coating the recording surface of a recording medium with a water-proofing agent which forms lake with a dye. Japanese Patent Application Laid-Open No. S59-096988 discloses a recording medium obtained by post-coating a pigment-containing ink-receiving layer of the recording medium with a water-soluble salt compound of a metal having an ionic valency of 2 or higher as an improver for the ink-receiving layer for the purpose of improving the water resistance of the resulting recorded image. Japanese Patent Application Laid-Open No. H04-323075 discloses a recording sheet obtained by post-coating an alumina hydrate-containing layer of a recording medium having the alumina hydrate-containing layer with a divalent metal ion solution for the purpose of improving the color reproducibility of the resulting recorded image and achieving a high color density. Japanese Patent Application Laid-Open No. H08-112969 discloses an ink jet recording medium obtained by post-coating an alumina hydrate-containing ink-receiving layer of a recording medium having the ink-receiving layer with a solution of a transition metal salt forming a complex with a dye molecule for the purpose of inhibiting bleed or migration of the resulting recorded image. Japanese unexamined Patent Publication No. 2003-514699 discloses an ink jet recording medium obtained by post-coating a silica-containing ink-receiving layer of a recording medium with a solution of an organic metal polyvalent metal salt for the purpose of improving the quality and washing resistance of the resulting recorded image.

Recording media using an ink-receiving layer obtained by coating a substrate with a coating liquid containing both inorganic pigment dispersed therein and metal salt compound dissolved therein have also been proposed. Japanese Patent Application Laid-Open No. S58-094491 discloses an ink jet recording sheet containing synthetic silica and a weak acid salt or oxide compound of a divalent metal for the purpose of improving the discoloration/fading resistance of a coloring material. Japanese Patent Application Laid-Open No. H10-329404 discloses an ink jet recording medium containing in an ink-receiving layer a mixture of a porous aluminum oxide usable as a carrier for catalysts and ceramics and a compound having an element of a rare earth metal series and having an atomic number of from 57 to 71 in a periodic system. Japanese Patent Application Laid-Open No. S61-043593 discloses an ink jet recording medium coated with a coating liquid containing a porous inorganic pigment and magnesium sulfate and/or a complex salt thereof. Japanese Patent Application Laid-Open No. S61-057380 discloses an ink jet recording medium containing a porous inorganic pigment and hardly soluble magnesium. Japanese Patent Application Laid-Open No. S61-057379 discloses an ink jet recording medium containing a porous inorganic pigment and a water-soluble aluminum salt. Japanese Patent Application Laid-Open No. S61-063477 discloses an ink jet recording medium obtained by causing both porous inorganic pigment and hardly soluble magnesium compound such as magnesium oxide or magnesium carbonate to be contained in an ink-receiving layer for the purpose of improving light resistance, water resistance and color density.

Inorganic pigments subjected to a specific cationization treatment and ink jet recording media using such an inorganic pigment have also been known. Specifically, Japanese Patent Application Laid-Open No. S63-166586 discloses a recording medium containing silica surface-treated with a metal soap, hydroxide, salt or oxide of a metal for the purpose of improving water resistance and light resistance. This publication only discloses, regarding a method for surface-treating silica, aging for 20 minutes under heating conditions of 90° C. upon synthesis of silica as well as the timing of adding the metal compound for the surface treatment. Japanese Patent Application Laid-Open No. H03-218887 discloses an ink jet recording medium containing a magnesium-containing inorganic pigment surface-treated with an aluminum compound or silicon compound at a heating temperature of 90° C. for the purpose of improving the storage stability of the resulting recorded image. Japanese Patent Application Laid-Open No. H01-258980 discloses a recording medium using an organic cationic polymer having a silane-coupling site or a pigment having a surface of subjected to a cationization treatment with a metal oxide for the purpose of improving the storage stability of the resulting recorded image. Japanese Patent Application Laid-Open No. H01-259982 discloses an ink jet recording sheet using silica surface-treated with calcium, magnesium or barium by heating for 20 minutes at 90° C. for the purpose of improving light resistance.

Japanese Patent Application Laid-Open No. H06-220251 discloses a method for forming a reactive metal site on the surface of a particle property modifier by subjecting the surface of the modifier to a metal ion activating treatment. Japanese Unexamined Patent Publication No. 2004-504136 discloses a method for modifying a catalyst carrier by chemically bonding a hydroxyl group of an untreated catalyst carrier partially dissolved in a water-soluble acid solution and/or an aqueous neutral solution to a metal with a modifying component having an alkyl group or acyl group at a metal atom through an oxygen atom.

DISCLOSURE OF THE INVENTION

The present inventors have carried out an investigation as to the state of the prior art. As a result, sufficient effects have been unable to be achieved as to fastness in general. Thus, the techniques disclosed in the above-described patent articles have been investigated in detail.

First, an investigation has been made as to the recording media disclosed in Japanese Patent Application Laid-Open Nos. S55-053591, S55-150396, S59-096988, H04-323075, and H08-112964 as well as in Japanese Unexamined Patent Publication 2003-514699, which are obtained by overcoating the ink-receiving layer on the recording medium with a solution containing a metal salt compound so as to form a "coexisting" state with the inorganic pigment making up this receiving layer. In this case, it has been found that the metal salt dissolved in the solution does not remain on the surface of the ink-receiving layer, but penetrates into the ink-receiving layer together with the solution. It has also been found that the improvement in water resistance requires overcoating with a concentrated metal salt solution to facilitate the formation of a complex with a coloring material. The components of the ink-receiving layer have been researched by means of XRD and XPS. As a result, the XRD has revealed that the water-resistant effect is related to the presence of a crystal derived from the metal salt. In the XPS measurement, potential transfer of the inorganic pigment and the metal of the metal salt has been unable to be confirmed irrespective of the water-resistant effect. In other words, it has been found that the improvement in water resistance requires that the inorganic pigment and the metal salt exist independently of each other, and the metal salt exists in the form of a crystal. However, sufficient effects have not been observed as to the improvements in light resistance and ozone resistance even when the water resistance has been improved.

Second, an investigation has been made as to the recording media disclosed in Japanese Patent Application Laid-Open Nos. S58-094491, H10-329404, S61-043593, 561-057380, S61-057379 and S61-063477, which use the ink-receiving layer obtained by coating a substrate with a coating liquid containing both inorganic pigment dispersed therein and a metal salt compound dissolved therein. Even in this system, there has been need of causing a crystal derived from the metal salt to be present for achieving the water-resistant effect like the case where the metal salt solution is overcoated. Further, when XRD and XPS measurements have been conducted, the improvement in water resistance has required that the inorganic pigment and the metal salt exist independently of each other, and the metal salt exists in the form of a crystal. With respect to the ozone resistance and light resistance, no improving effect has been confirmed like the case where the metal salt solution is overcoated.

Further, an investigation has been made on the recording medium disclosed in Japanese Patent Application Laid-Open No. S63-166586, the inorganic pigment which makes up the ink-receiving layer and has a n-valent metal ion at the surface thereof. In these "coexisting" types, a mixture of the inorganic pigment and the n-valent metal ion has been dried at from room temperature to about 100° C. and then formed into a sheet. The n-valent metal ion contained in this receiving layer in the coexisting state is in a free condition independently of the inorganic pigment in the receiving layer. Therefore, it has been found that when a coloring material as an anion is applied to the receiving layer together with water or a solvent, the metal ion is caused to flow away together with the coloring material, and so the dye application effect is lowered. Here, the n-valent metal ion itself in the free condition does not have the function of improving the light resistance.

In addition, an investigation has been made as to the conventional inorganic pigments subjected to the specific cationization treatment and the ink jet recording media using such an inorganic pigment. In Japanese Patent Application Laid-Open Nos. S63-166586, H03-218887 and H01-259982 using the metal compound for the purpose of inactivating an active site on the surface of silica, the metal compound seems to be adsorbed apparently. However, the fact is merely that a cationic component exists on the surface, and potential transfer of the metal used and oxygen on the surface of the inorganic pigment has not been confirmed by the XPS measurement. When acid radical intensity on the surface of the inorganic pigment has been measured, an acid radical has existed, and the acid point has not been inactivated. When these have been measured by XRD, it has been confirmed that the metal compound exists in a state of a crystal on the surface of the inorganic pigment, which has been expected to be due to the interaction between the crystallized metal compound and the coloring material. Japanese Patent Application Laid-Open No. H01-258980 teaches that an organic cationic site is added to hydrogen of a hydroxyl group through a long-chain spacer group of an organic substance like a silane coupling agent. It has been found that since any of these patent articles uses such a constitution that a molecule is movable in a free volume of the inorganic pigment, existence distribution (existence position) in the receiving layer is changed by surrounding water, and so the intended effect cannot be surely and stably achieved. This has been understood from the fact that after the inorganic pigment or recording medium is exposed to water, the dye application effect is reduced more remarkably.

An investigation has been further made as to the inorganic pigments surface-treated with a metal ion and the ink jet recording media using such a pigment. Japanese Patent Application Laid-Open No. H06-220251 teaches that an active site on the surface of finely particulate silica is protected by a calcium ion, magnesium ion or barium ion. Japanese Unexamined Patent Publication No. 2004-504136 teaches that $Me(OR)_x$ (wherein Me is a metal, R is an alkyl group or acyl group, and x is an integer of 1 to 5) is used to cause an acid point or base point on the surface of an untreated catalyst carrier (pigment) not depending on the properties of acid and base to react with the metal Me. As the untreated catalyst carrier not depending on the properties of acid and base, there is used alumina, magnesia, titania or zinc oxide. However, it has been found that in these methods, Me used in the modification becomes a new active point to decompose an organic substance such as a coloring material, though Me can be reacted with the hydroxyl group of the untreated catalyst carrier to modify the catalyst carrier.

Thus, efforts have been made from a new point of view, and the present invention has solved the technical problems to provide an inorganic pigment and a recording medium which can achieve a dye application effect remarkably superior to the state of the prior art and are excellent in gas resistance.

The present invention solves the above problems.

A first aspect of the present invention is a surface-modified inorganic pigment comprising an inorganic pigment having acid function and an amorphous body located on the surface of the inorganic pigment having acid function and formed by at least a divalent or higher-valent metal and an anion component in a state where the inorganic pigment and the amorphous body do not chemically bond to each other, wherein the surface-modified inorganic pigment does not exhibit acid.

A second aspect of the present invention is a process for producing the surface-modified inorganic pigment according to the first aspect of the present invention, which comprises a step of applying a divalent or higher-valent metal salt hydrate to an inorganic pigment having acid function, and a step of causing the divalent or higher-valent metal salt hydrate applied to exist in an amorphous state.

A third aspect of the present invention is a colored surface-modified inorganic pigment obtained by further coloring the surface-modified inorganic pigment according to the first aspect of the present invention with a coloring agent.

A fourth aspect of the present invention is a process for producing a colored surface-modified inorganic pigment obtained by further coloring, with a coloring agent, the surface-modified inorganic pigment according to the first aspect of the present invention, in which the amorphous body is an amorphous body formed from a divalent or higher-valent metal, an anion component and a water molecule, which comprises a step of applying a coloring-agent-containing solution to the surface-modified inorganic pigment, and a step of drying the surface-modified inorganic pigment to which the coloring agent-containing solution has been applied with thermal energy by which the amorphous body contained in the surface-modified inorganic pigment is not transformed into a crystal.

A fifth aspect of the present invention is a recording medium comprising a substrate and a coloring-material-receiving layer which is formed on the substrate and contains an inorganic pigment, wherein the inorganic pigment is the surface-modified inorganic pigment according to the first aspect of the present invention.

A sixth aspect of the present invention is a process for producing a recording medium in which a coloring-material-receiving layer formed on a substrate contains the surface-modified inorganic pigment according to the first aspect of the present invention, which comprises a step of forming the coloring-material-receiving layer containing the surface-modified inorganic pigment on the substrate, and a step of drying the coloring-material-receiving layer with thermal energy by which the amorphous body contained in the surface-modified inorganic pigment existing in the coloring-material-receiving layer is not transformed into a crystal.

A seventh aspect of the present invention is an image forming method comprising applying a recording liquid to a recording medium in which a coloring-material-receiving layer containing the surface-modified inorganic pigment according to the first aspect of the present invention is formed on a substrate, thereby forming an image.

An eighth aspect of the present invention is a recorded image obtained by forming an image on a recording medium in which a coloring-material-receiving layer formed on a substrate contains the surface-modified inorganic pigment according to the first aspect of the present invention, with a coloring agent.

According to the first aspect of the present invention, the acid point of the inorganic pigment is defunctionalized by the amorphous body, so that the influence of the acid point can be eliminated to properly gather applied matter. For example, when the applied matter is a dye, the adhesion of the dye is good, and a crystal, which is an aggregate, is also made proper. The second aspect of the present invention is a process capable of stably producing the surface-modified inorganic pigment according to the first aspect of the present invention.

According to the third aspect of the present invention, the surface-modified inorganic pigment according to the first aspect of the present invention is colored with a coloring agent, so that the coloring agent can be applied in a remarkably excellent condition compared with the prior art. When the coloring agent is a dye in particular, the adhesion of the dye is good. A crystal, which is an aggregate of dyes, is also made proper, and so the acid functionality affecting the ability to decompose the dye is substantially not exhibited. Accordingly, good coloring ability and fastness of the dye can be achieved. The fourth aspect of the present invention is a process capable of stably producing the colored surface-modified inorganic pigment according to the third aspect of the present invention.

The fifth aspect of the present invention is a recording medium in which the surface-modified inorganic pigment according to the first aspect of the present invention is used in a coloring-material-receiving layer formed on a substrate, with which a recording medium excellent in fastness can be provided. The sixth aspect of the present invention is a production process of the recording medium according to the present invention. According to the production process of the present invention, the recording medium according to the present invention can be produced.

The seventh aspect of the present invention is an image forming method comprising applying a recording liquid to a recording medium in which a coloring-material-receiving layer containing the surface-modified inorganic pigment according to the first aspect of the present invention is formed on a substrate. The eighth aspect of the present invention is a recorded image obtained by forming, with a coloring agent, an image on a recording medium in which a coloring-material-receiving layer formed on a substrate contains the surface-modified inorganic pigment according to the first aspect of the present invention. According to both aspects, recorded image excellent in fastness can be provided.

To be specific, the surface-modified inorganic pigment according to the present invention is used as a material for adsorbing an organic compound, whereby good gas resistance can be imparted to the organic compound adsorbed. When the surface-modified inorganic pigment according to the present invention is caused to exist on the surface of an organic substance and is used for protecting the organic substance, good fastness can be achieved in the organic substance. A bifunctional inorganic pigment is used as the inorganic pigment having acid function, whereby a polar organic compound (for example, a coloring material) can also be more strongly adsorbed by a polar action that the bifunctional inorganic pigment has. Good water resistance and coloring ability can be achieved in addition to the gas resistance and light resistance. Here, the bifunctional inorganic pigment means an inorganic pigment having both active points of an acid point and a base point on the surface thereof. In the present invention, water molecules existing in the surface and interior of an inorganic pigment, which are one of the causes of lowering the fastness resistance, are included or captured, whereby the above objects can be achieved.

Further features of the present invention will become apparent from the following description of exemplary embodiments with reference to the attached drawings.

BRIEF DESCRIPTION OF THE DRAWINGS

FIG. 19 illustrates the results of evaluation of ozone resistance with mixtures (B), (D), (E), (F) and (H).

FIG. 20 illustrates the results of evaluation of ozone resistance with a mixture (M).

BEST MODE FOR CARRYING OUT THE INVENTION

Figure 1:
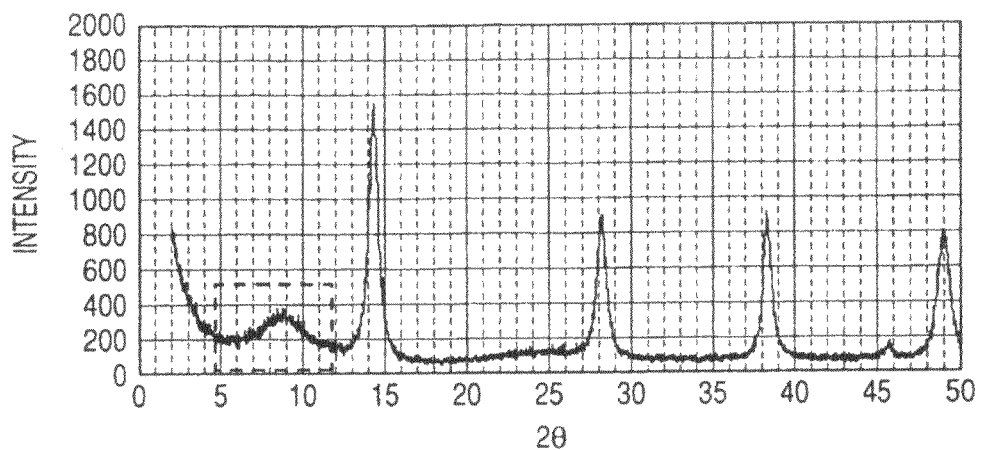
FIG. 1 diagrammatically illustrates the result of X-ray diffraction measurement as to a sample using boehmite as an inorganic pigment and magnesium acetate hydrate as a combination of a divalent or higher-valent metal and an anion component.

The present invention will hereinafter be described in detail.

The present inventors have paid attention to the fact that the degree of degradation by gases of a coloring material recorded on a recording medium using an inorganic pigment such as alumina hydrate or silica as a material for receiving the coloring material is remarkably higher than degradation by gases of the coloring material recorded on plain paper such as commercially available paper for copying. The surface properties of inorganic pigments such as alumina hydrate and silica have been investigated from many points of view. As a result, the inventors have noticed that the inorganic pigment such as alumina hydrate or silica has active points on the surface thereof unlike a receiving material such as cellulose in the plain paper. Thus, a coloring material was applied to many inorganic pigments to conduct a gas degradation test. As a result, it has been found that the presence of an acid point among the active points greatly affects the gas degradation. It has further been found that even in inorganic pigments having the acid point, a high-humidity environment in the gas degradation test on an inorganic pigment to which a dye has been applied greatly affects the gas degradation. Thus, an attention has been paid to the property of the inorganic pigment having an acid point to adsorb a water molecule on its acid point, and an investigation has been made as to the degree of fading and degradation of a coloring material by applying the coloring material to an inorganic pigment, heating the inorganic pigment within such a limit that its crystal structure is not destroyed, thereby changing the amount of adhesion water molecules, and then exposing the inorganic pigment to ozone gas. As a result, it has been found that the degree of fading of the coloring material is reduced as the amount of the adhesion water becomes small.

With respect to the gas degradation of the coloring material applied to the inorganic pigment, the present inventors have drawn the following inference. An adhesion water molecule existing at an acid point on the surface of an inorganic pigment such as alumina hydrate or silica forms a hydroxy radical by the oxidizing action of gases existing in the air, such as ozone. The coloring material existing on the surface of the inorganic pigment such as alumina hydrate or silica is affected by a strong oxidizing action of this radical, thereby degrading the coloring material. In view of this inference, for inhibiting the degradation of the coloring material, an extensive investigation has been made as to a method for inhibiting the change of an adhesion water molecule or crystal water molecule existing on the surface or between crystal layers of the inorganic pigment such as alumina hydrate or silica, into active oxygen or hydroxy radical.

First, a method of removing the adhesion water molecule or crystal water molecule existing on the surface or between crystal layers of the inorganic pigment such as alumina hydrate or silica by heating or the like has been considered. However, when the inorganic pigment such as alumina hydrate or silica has been heated for removing the water molecule adhered to the surface of the inorganic pigment such as alumina hydrate or silica, a problem that the crystal structure of the inorganic pigment such as alumina hydrate or silica is changed has arisen though the adhesion water has been removed. A problem that the acid point is activated by the heating has also arisen. Even if the adhesion water has been able to be removed at such a heating temperature that the crystal structure of the inorganic pigment such as alumina hydrate or silica is not changed, a problem that water in the air adheres to the resulting inorganic pigment such as alumina hydrate or silica again when the inorganic pigment is left to stand in the air has arisen. When the inorganic pigment such as alumina hydrate or silica has been dyed with a coloring material solution for the purpose of coloring the inorganic pigment, a problem that water contained in the coloring material solution adheres to the inorganic pigment again has arisen.

Thus, the present inventors have considered that the point is how to inhibit a radical producing reaction by an interaction between a water molecule adsorbed at the acid point on the surface of the inorganic pigment and ozone gas, and is not to remove the water molecule adsorbed at the acid point on the surface of the inorganic pigment. In other words, an extensive investigation has been made as to a method for shielding reactive points on the surface of the inorganic pigment for improving the gas resistance of the coloring material adsorbed on the inorganic pigment such as alumina hydrate or silica. Specifically, an investigation has been made such that a compound capable of including or capturing adhesion water on the surface of the inorganic pigment such as alumina hydrate or silica is caused to exist on the surface of the inorganic pigment such as alumina hydrate or silica.

As a result, a method of forming an amorphous body on the surface of the inorganic pigment having acid, such as alumina hydrate or silica, with at least a divalent or higher-valent metal and an anion component has been found. It has also been found that the inorganic pigment is converted to a surface-modified inorganic pigment exhibiting no acid function in a state where the inorganic pigment and the amorphous body do not chemically bond to each other, thereby improving the gas resistance, thus leading to completion of the present invention.

Incidentally, the surface of the inorganic pigment such as alumina hydrate or silica includes inner wall surfaces of pores in a porous inorganic pigment in addition to the surface of the inorganic pigment.

In the present invention, the amorphous body formed by at least the divalent or higher-valent metal and the anion component means an aggregate of a metal salt having plural layer-to-layer spacings and interstitial distances unlike a crystal having a regular layer-to-layer spacing. When this aggregate is observed through X-ray diffraction (XRD), no clear peak derived from the metal salt compound is present, and a broad 2θ peak derived from the combination of the divalent or higher-valent metal and the anion component can be observed. In the present invention, a half-width of a broad peak derived from the amorphous body in an X-ray diffraction chart of diffraction intensity with respect to 2θ is particularly favorably 2° or more.

Figure 2:
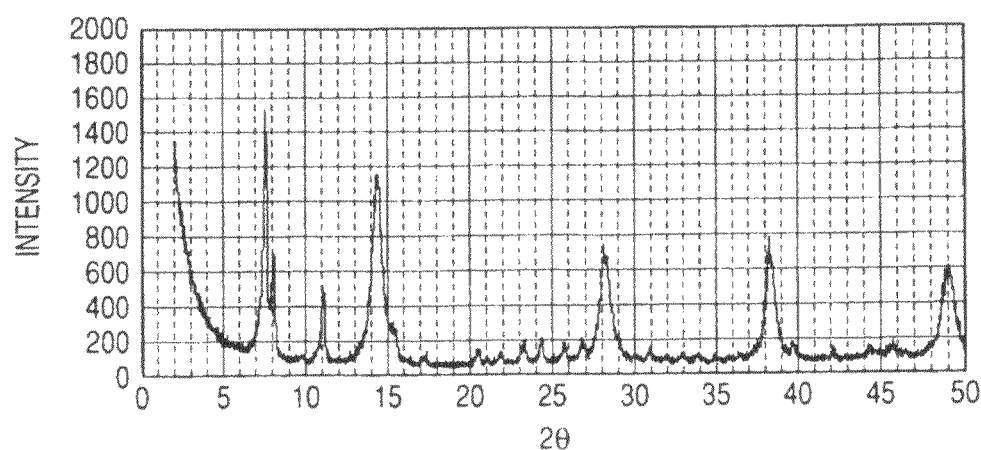
FIG. 2 diagrammatically illustrates the results of X-ray diffraction measurement as to a sample obtained by baking the sample yielding the result illustrated in FIG. 1 to about 250° C.

For example, an example of the measured result of X-ray diffraction when boehmite and magnesium acetate hydrate are used as an inorganic pigment and as a combination of the divalent or higher-valent metal and the anion component is illustrated in FIG. 1. In FIG. 1, a broad peak (portion surrounded by a broken line) indicating an amorphous body derived from magnesium acetate hydrate is illustrated in a range of from about 5° to about 10°. When this sample is baked at a high temperature, the broad peak is changed to a sharp peak, so that the sharp peak is analyzed, whereby what the broad peak is derived from can be identified. For example, when a sample obtained by baking the sample, from which the chart illustrated in FIG. 1 has been obtained, at about 250° C. is subjected to XRD measurement, such a chart as illustrated in FIG. 2 is obtained. This chart is analyzed, whereby it can be identified that the broad peak appeared in FIG. 1 is derived from magnesium and an acetate ion.

In the present invention, the state where the inorganic pigment and the amorphous body do not chemically bond to each other means a state where there is no change in binding energy that electrons of the atoms making up the inorganic pigment have. The condition that the inorganic pigment and the amorphous body do not chemically bond to each other can be determined by comparing the inorganic pigment before surface modification with the surface-modified inorganic pigment by X-ray photoelectron spectroscopy (XPS measurement). In other words, when the inorganic pigment and the amorphous body do not chemically bond to each other, neither the positions of peaks derived from 2p of a metal making up the inorganic pigment and 1s of oxygen nor the forms of profiles are different before and after surface modification, so that the surface conditions thereof are not different.

For example, when alumina hydrate is used as the inorganic pigment, alumina hydrate itself and alumina hydrate surface-modified are subjected to XPS measurement to compare the positions of peaks derived from 2p of alumina hydrate and 1s of oxygen O as well as the forms of profiles. More specifically, when neither the peak positions nor profile forms are different before and after the surface modification, it is considered that the inorganic pigment does not bond to the amorphous body derived from the combination of the divalent or higher-valent metal and the anion component capable of forming a salt with the metal. On the other hand, when the peak positions or profile forms are different, or the peak positions or profile forms shift, it is considered that the inorganic pigment and the amorphous body chemically bond to each other.

Figure 9:
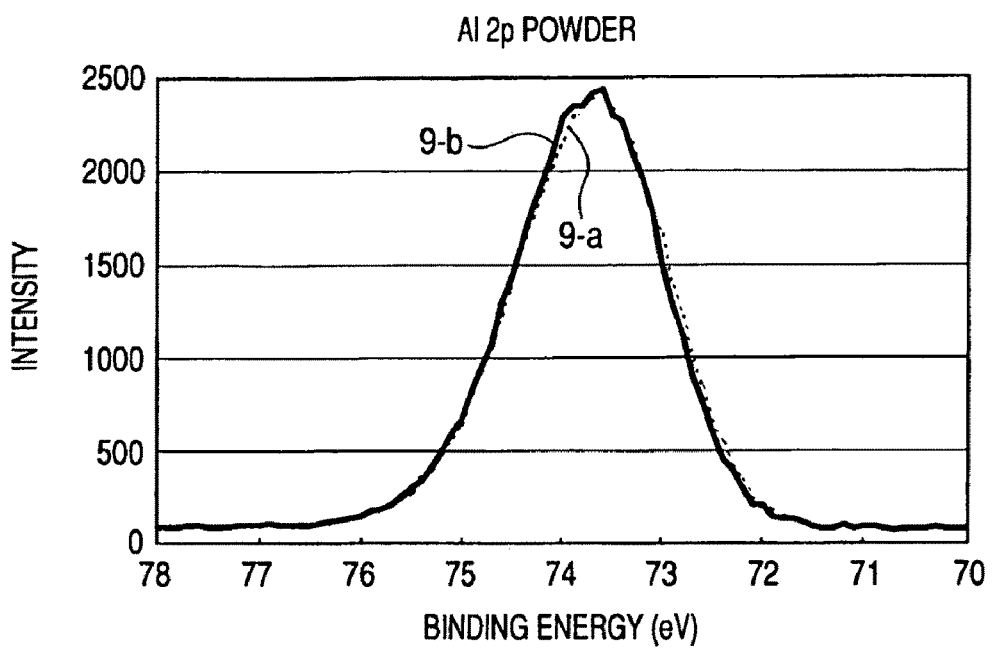
FIG. 9 diagrammatically illustrates Al 2p peaks measured by X-ray photoelectron spectroscopy (XPS), wherein '9-$a$' is a chart of a sample with an amorphous body formed on boehmite with magnesium acetate tetrahydrate, and '9-$b$' is a chart of boehmite alone.
Figure 10:
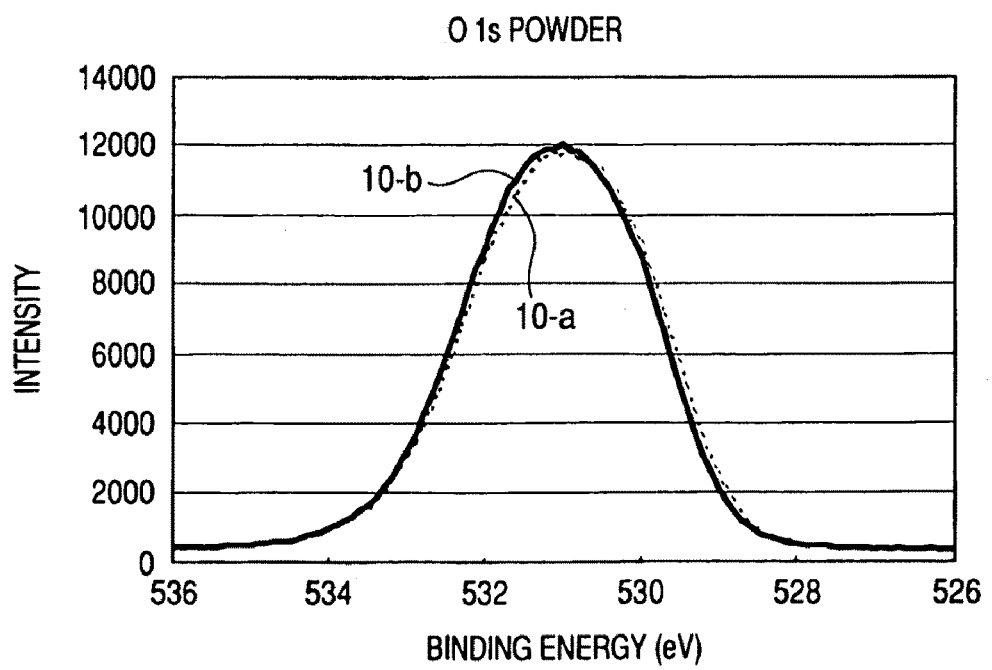
FIG. 10 diagrammatically illustrates O 1s peaks measured by X-ray photoelectron spectroscopy (XPS), wherein '10-$a$' is a chart of a sample with an amorphous body formed on boehmite with magnesium acetate tetrahydrate, and '10-$b$' is a chart of boehmite alone.
Figure 11:
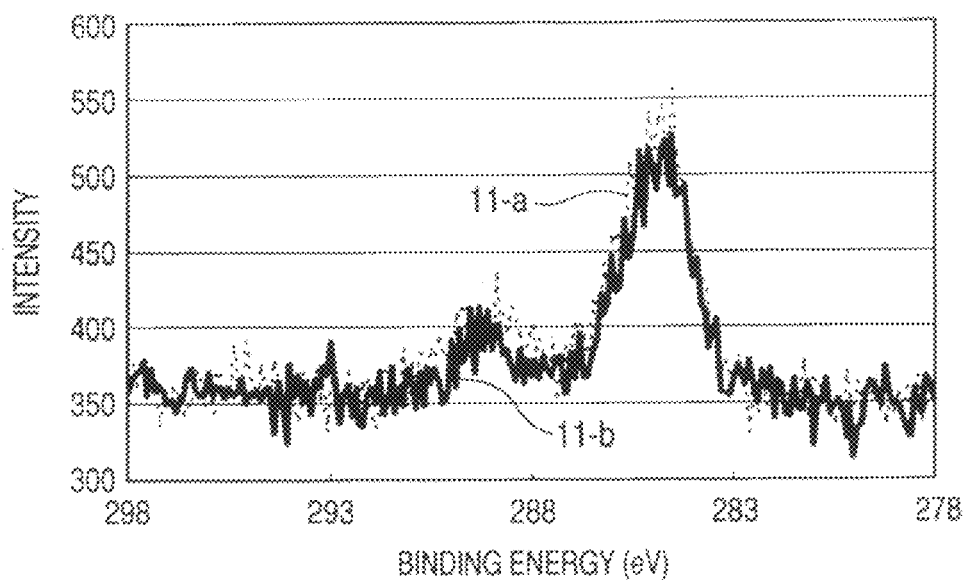
FIG. 11 diagrammatically illustrates C 1s peaks measured by X-ray photoelectron spectroscopy (XPS), wherein '11-$a$' is a chart of a sample with an amorphous body formed on boehmite with magnesium acetate tetrahydrate, and '11-$b$' is a chart of boehmite alone.

As a specific example, comparison between peaks derived from Al 2p of an aluminum element or O 1s before and after the surface modification in the case of boehmite alone and the case where an amorphous body is formed on boehmite with magnesium tetrahydrate is shown. The comparison between peaks derived from Al 2p of the aluminum element as measured by X-ray photoelectron spectroscopy (XPS) is illustrated in FIG. 9, wherein '9-a' is a case where an amorphous body was formed on boehmite with magnesium acetate tetrahydrate, and '9-b' is a case of boehmite alone. The comparison between peaks derived from O 1s of an oxygen element as measured by X-ray photoelectron spectroscopy (XPS) is illustrated in FIG. 10, wherein '10-a' is a case where an amorphous body was formed on boehmite with magnesium acetate tetrahydrate, and '10-b' is a case of boehmite alone. The comparison between peaks derived from C 1s of a carbon element as measured by X-ray photoelectron spectroscopy (XPS) is illustrated in FIG. 11, wherein '11-a' is a case where an amorphous body was formed on boehmite with magnesium acetate tetrahydrate, and '11-b' is a case of boehmite alone. In FIGS. 9, 10 and 11, no shift of each energy is observed, and a chemical bond between boehmite and the amorphous body cannot be identified.

In the present invention, the state where the inorganic pigment exhibits no acid function means such a state that the activity of the acid point is low. Examples thereof include one in which the activity of the acid point has been lowered by causing the active acid point of the inorganic pigment to react with a desired compound to produce a chemical bond which can be identified by X-ray photoelectron spectroscopy (XPS), and one exhibiting such a property that the acid point of the inorganic pigment has seemingly been eliminated to lose the acid function due to that adhesion between the inorganic pigment and the amorphous body of which its chemical bond cannot be identified by X-ray photoelectron spectroscopy (XPS) as in the present invention.

A specific example of a method of measuring the activity of the acid point is a method of measuring the activity of the acid point on the surface by a gas adsorption method such as a temperature programmed desorption test (TPD test). The results of measurement by the temperature programmed desorption test (TPD) using for example, ammonia, are illustrated in FIGS. 15 and 16.

Figure 15:
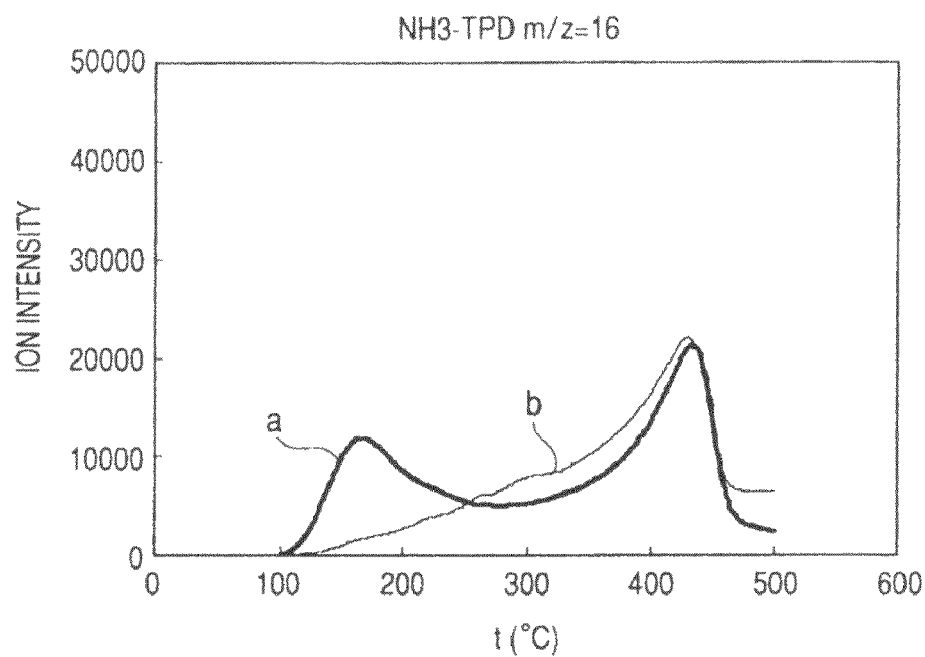
FIG. 15 diagrammatically illustrates the results of measurement of mass spectrum (m/z=16) derived from ammonia in a temperature programmed desorption test (TPD) using ammonia, wherein 'a' is a chart of boehmite, and 'b' is a chart of boehmite to which magnesium acetate tetrahydrate has adhered.
Figure 16:
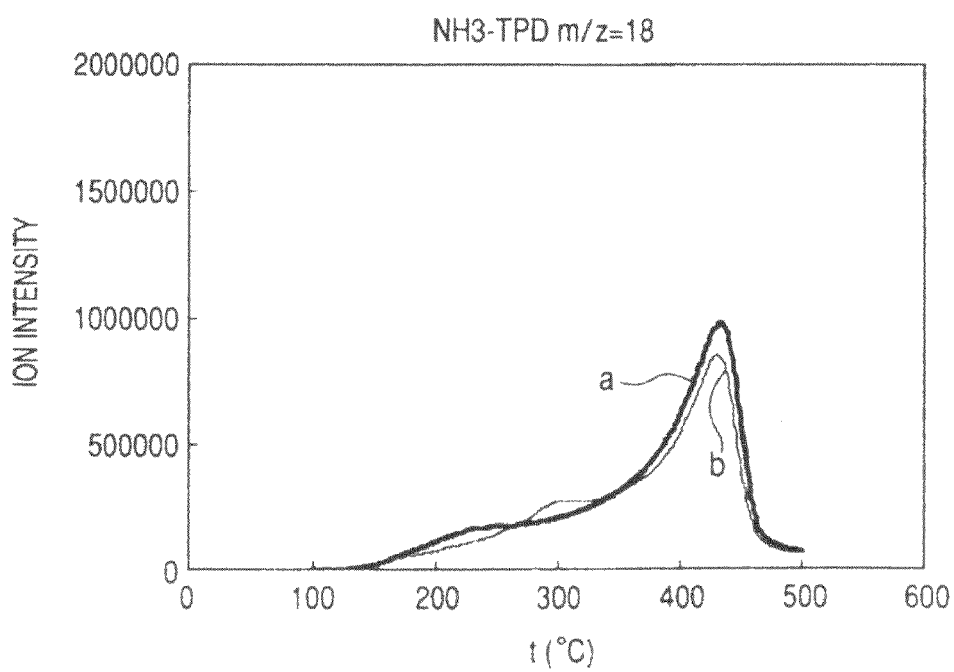
FIG. 16 diagrammatically illustrates the results of measurement of mass spectrum (m/z=18) derived from water in a temperature programmed desorption test (TPD) using ammonia, wherein 'a' is a chart of boehmite, and 'b' is a chart of boehmite to which magnesium acetate tetrahydrate has adhered.

FIG. 15 illustrates a measured data of mass spectrum (m/z=16) derived from ammonia, in which 'a' is a chart of boehmite, and 'b' is a chart of boehmite to which magnesium acetate tetrahydrate has adhered. A difference is observed between 'a' and 'b' at t=about 200° C. The peak at t=about 200° C. is considered to indicate ammonia physically adsorbed. Since no ammonia physically adsorbed can be observed in 'b' according to the present invention, it can be inferred that the acid point (acid function portion), which is a chemical adsorption point originating the physical adsorption of an ammonia molecule, was reduced. This implies that in the boehmite to which magnesium acetate hydrate has adhered, the acid point of boehmite is destroyed by the magnesium acetate (hydrate) adhered to the surface thereof to reduce the acid function on the surface of boehmite.

A peak was observed in both 'a' and 'b' at t=about 400° C. However, this peak is considered to be due to desorption of crystal water attending on change in the crystal structure of boehmite because the peak corresponds to a peak in FIG. 16 illustrating the behavior of mass spectrum (m/z=18) derived from water.

As described above, the amorphous body is caused to exist in the prescribed state on the inorganic pigment having acid function, whereby a water molecule existing on the surface of the inorganic pigment, for example, a water molecule adsorbed on the acid point exhibiting acid function, can be included or captured and taken in as a water molecule represented by crystal water or adhesion water of the amorphous body itself. The presence in the state of amorphous body gives a high degree of freedom to facilitate the inclusion or capture of the water molecule existing on the surface of the inorganic pigment having acid function. When becoming a crystal state, it is hard to include or capture the water molecule.

On the other hand, one that is not an amorphous body (for example, existing in a state of crystal), one directly reacting with the inorganic pigment (for example, a divalent metal covalently bonds to the surface of the inorganic pigment), or one existing in a state of a molecule or ion without interacting with the inorganic pigment is not favorable. An example thereof is a case where a metal ion bonds to an active point on the surface of the inorganic pigment as described in Japanese Patent Application Laid-Open Nos. H06-220251 and Japanese Unexamined Publication No. 2004-504136. In this case, a difference is observed in the position of a peak attributed to 2p of the metal making up the inorganic pigment or 1s of oxygen or in the form of profile when X-ray photoelectron spectroscopy (XPS) measurement is conducted, so that change in surface profile due to surface modification can be recognized. This is a case where a metal ion bonds to an active point of the inorganic pigment. However, this is not favorable because the metal bonded becomes a new active point as described above.

Figure 3:
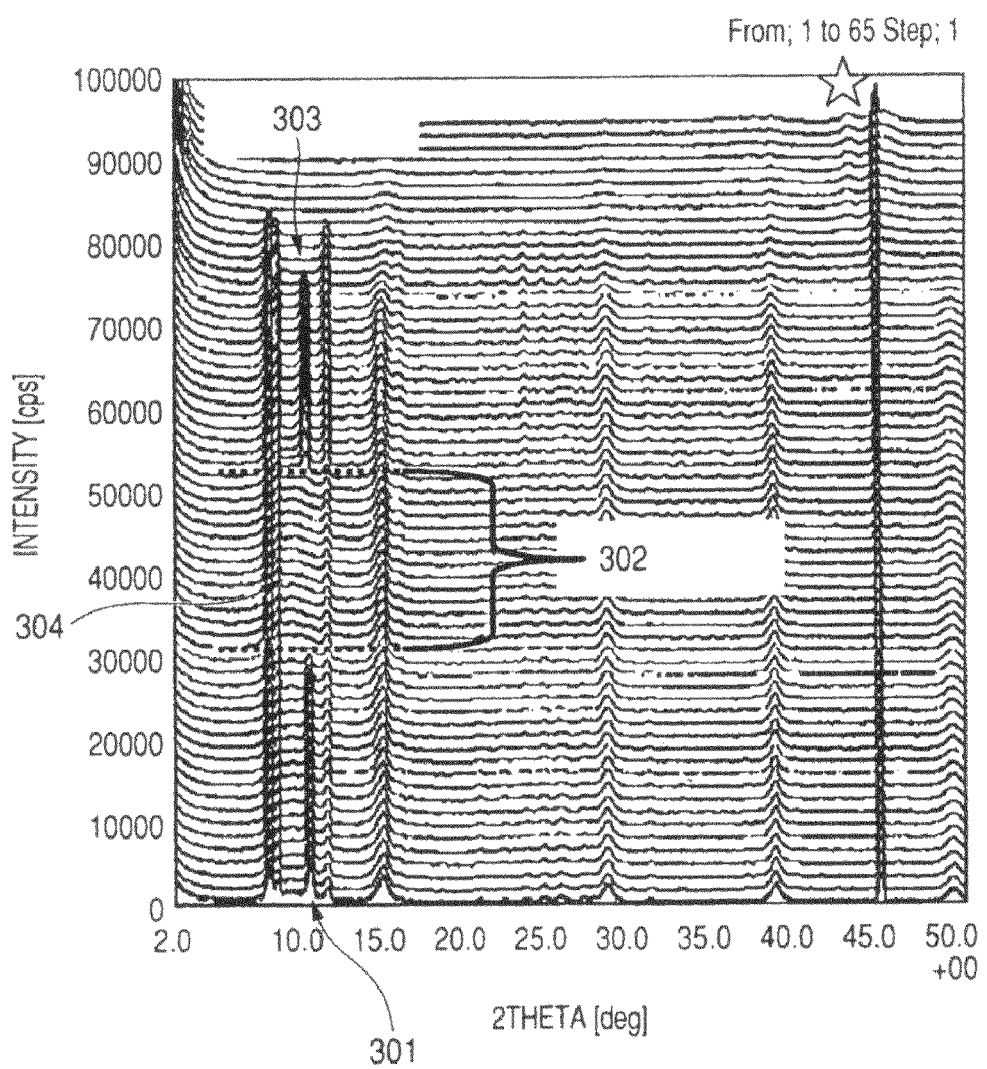
FIG. 3 diagrammatically illustrates a profile obtained by conducting X-ray diffraction measurement while heating a mixture (B).

In the case where the combination of a divalent or higher-valent metal and an anion component is a crystallized metal salt, a sharp diffraction intensity peak derived from the metal salt crystal is observed when XRD measurement is conducted in the same manner as described above. A specific chart by the XRD measurement is illustrated in FIG. 3. FIG. 3 shows data obtained by using magnesium acetate tetrahydrate as a component of the amorphous body with boehmite that is an inorganic pigment having acid function and using an X-ray diffraction (XRD) method by means of CuKα manufactured by Rigaku Co., which can conduct X-ray diffraction measurement while heating this compound. The axis of abscissa represents 2θ, and the measurement was conducted from 2° to 50°. The axis of ordinate represents intensity and indicates measured results in the order of measuring temperature. The temperature is raised by about 6° C. in one measurement of from 2° to 50°. A broad peak (304) indicating the presence of the amorphous body derived from the combination of magnesium and acetate ion could be observed in a temperature range of from about 40° C. to about 250° C. and a 2θ range of from about 5° to about 10° in FIG. 3. Incidentally, a peak (301) indicating the presence of a crystal of magnesium acetate monohydrate and a broad peak (304) indicating the amorphous body can be observed in a temperature range of from about 40° C. to about 140° C. Only a broad peak (304) indicating the presence of the amorphous body can be observed in a temperature range (302) of from about 140° C. to about 230° C. A peak (303) indicating the presence of a crystal of magnesium acetate anhydride and a broad peak (304) indicating the amorphous body can be observed in a temperature range of from about 230° C. to about 250° C. Only a peak (303) indicating the presence of a crystal of magnesium acetate anhydride can be observed at about 250° C. or more, and all peaks derived from magnesium acetate vanish at about 320° C. or more.

From the above, the favorable state of the combination of the divalent or higher-valent metal and the anion component defined in the present invention is a state that where broad peak of (304) in FIG. 3 is observed. A state in the range of (302) where only the board peak (304) is observed is particularly favorable. When the peak of (301) or (303) coexists in addition to the broad peak (304), that forming the amorphous body may form a crystal in some cases, and it is difficult to achieve the effect by the formation of the amorphous body in the present invention. Therefore, when only the broad peak (304) is observed, the effect is stably achieved. On the other hand, an unfavorable state is a state that no broad peak (304) is observed.

Figure 4:
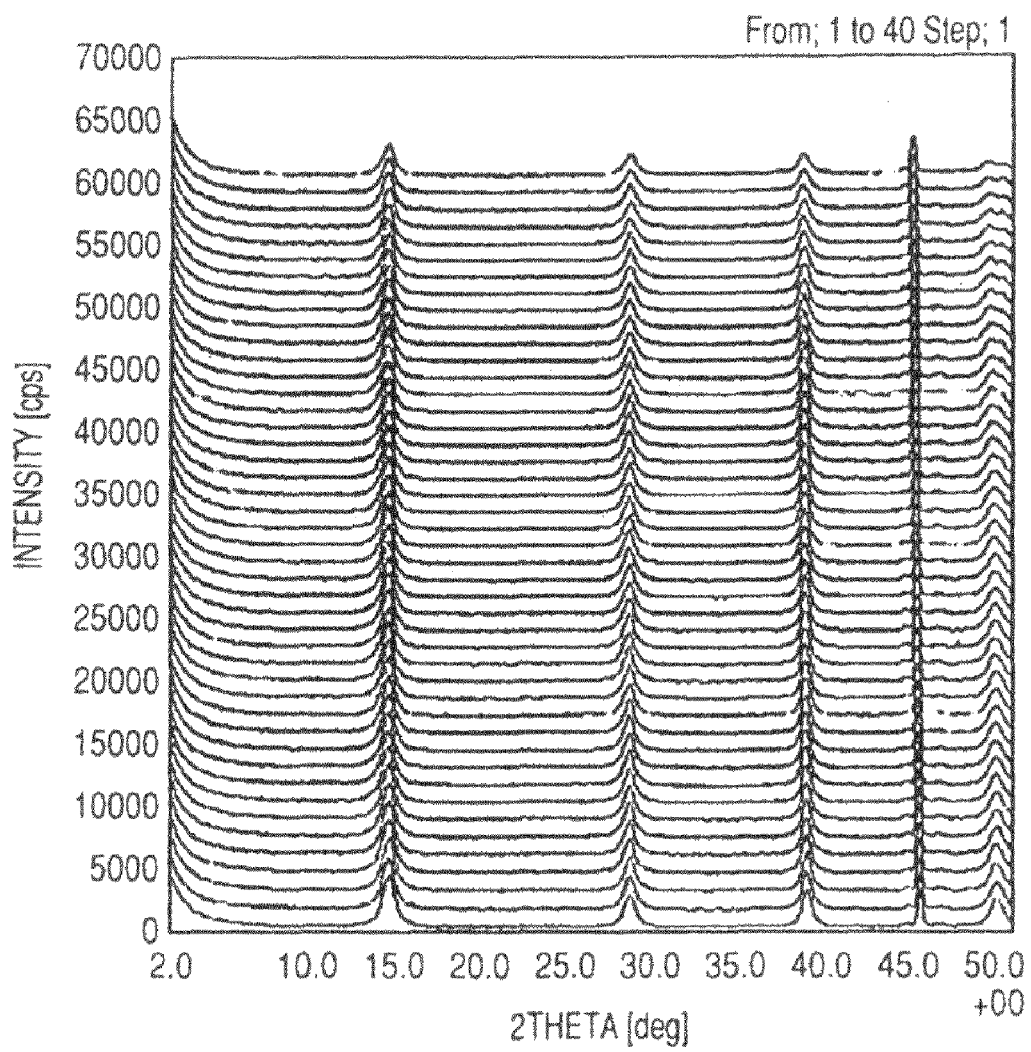
FIG. 4 diagrammatically illustrates a profile obtained by conducting X-ray diffraction measurement in the case where a metal salt is present in neither crystalline state nor amorphous state.

When the XRD measurement is conducted in the case where a metal salt is present in neither crystalline state nor amorphous state but present in a state of a molecule or metal ion, a diffraction intensity peak with respect to 2θ cannot be observed. In other words, measured date like a chart of X-ray diffraction measurement as to the inorganic pigment having acid function alone is obtained as illustrated in FIG. 4 in which a chart of XRD measurement in this state is indicated. In such a case, magnesium acetate tetrahydrate is present in neither amorphous state nor crystalline state. Incidentally, a metal ion can be measured by fluorescent X-ray measurement.

As described above, the amorphous body is formed by the divalent or higher-valent metal and anion component on the surface of the inorganic pigment having acid function, whereby the production of an active radical attacking a coloring material can be inhibited. It is thus considered that ozone resistance and light resistance can be improved.

The above-described mechanism of the present invention will hereinafter be described in detail with reference to the drawings.

The present inventors have expected the gas degradation mechanism of a coloring material applied to the surface of an inorganic pigment such as alumina hydrate or silica to be as follows.

Figure 5:
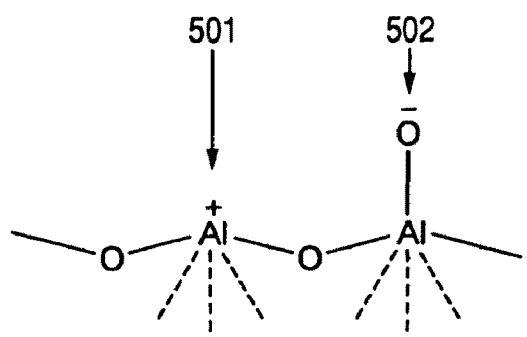
FIG. 5 typically illustrates a state where no adhesion water is present on the surface of alumina hydrate.
Figure 6:
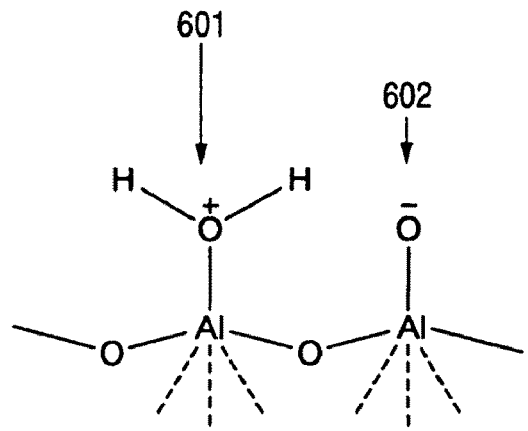
FIG. 6 typically illustrates a state where adhesion water is present on the surface of alumina hydrate.

In the case where no adhesion water exist on the surface of the inorganic pigment such as alumina hydrate or silica, a Lewis acid point (501) and a base point (502) are present as illustrated in FIG. 5, in which a state of, for example, alumina hydrate is illustrated. However, when water in the air or a coloring material solution for dyeing is applied, a water molecule is adsorbed on the Lewis acid point (501) in FIG. 5 to change the Lewis point to a Brønsted acid point as illustrated in FIG. 6. When the water molecule adsorbed on the Brønsted acid point is affected by a gas such as ozone, a radical is produced by an interaction between ozone and the adhesion water. It has been expected that the radical exerts a strong oxidizing action on the coloring material applied to the surface of the inorganic pigment such as alumina hydrate or silica to decompose the coloring material, i.e., cause degradation of the coloring material.

Figure 7:
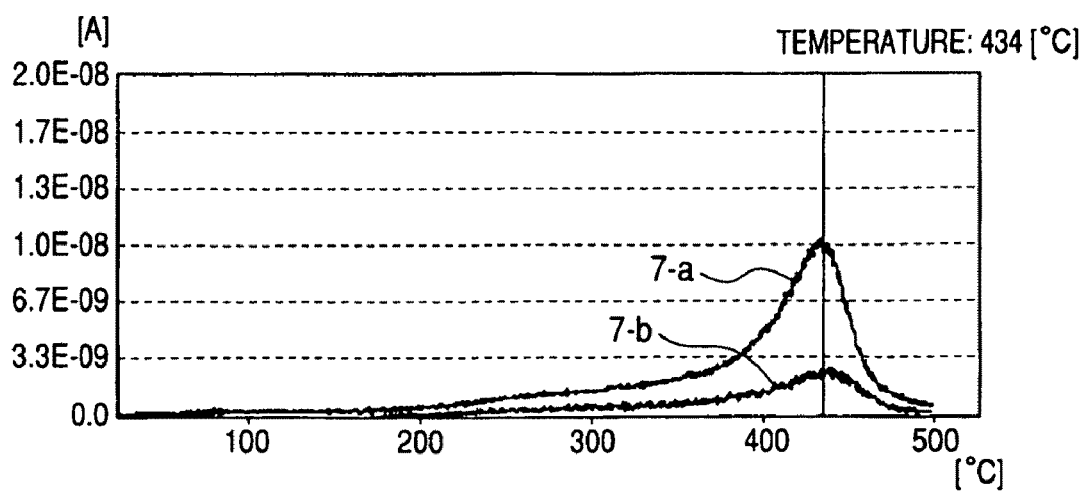
FIG. 7 diagrammatically illustrates profiles obtained by conducting TG-MASS measurement as to alumina hydrate, wherein '7-$a$' is a water molecule, and '7-$b$' is an oxygen molecule.

The above-described supposition has been confirmed by an experiment, and it has been proved that the rate of the coloring material degradation correlates with the quantity of the adhesion water on the surface of the alumina hydrate. Table 1 shows the results of an experiment on dye degradation by exposure of alumina hydrate to which a dye has been applied to ozone. A method of the experiment is as follows. Conditions of a heating temperature were varied, the quantity of adhesion water on the alumina hydrate was changed, C.I. Direct Blue 199 was applied as the coloring material to the alumina hydrate, and such alumina hydrate was left to stand for 4 hours in a container containing ozone at a concentration of 10 ppm to degrade the coloring material. UV-visible absorption spectrum measurement was conducted to determine retentions of UV-visible absorption spectrum intensity at 610 nm and 670 nm in the Q band. It is understood from Table 1 that the retentions of spectrum intensity at both 610 nm and 670 nm become higher as the heating temperature is made higher. The relation between the heating temperature and the quantity of crystal water or adhesion water on the alumina hydrate can be identified by TG-MASS measurement of the alumina hydrate. FIG. 7 illustrates results of the TG-MASS measurement obtained by measuring the quantities of a water molecule (7-*a*) and an oxygen molecule (7-*b*) of the alumina hydrate has with the heating temperature varied. The axis of abscissa represents the heating temperature, and the axis of ordinate represents the quantity. It is understood that when the heating temperature to the alumina hydrate is raised from ordinary temperature to about 450° C., the evaporation quantity of the crystal water or adhesion water (7-*a*) of the alumina hydrate increases. In other words, it is understood that when the heating temperature is raised in a range of from ordinary temperature to 450° C., the quantity of the water molecule such as crystal water or adhesion water of the alumina hydrate is lessened.

TABLE 1

|  |  | wavelength | |
|---|---|---|---|
|  |  | 610 nm | 670 nm |
| Heating temperature | None | 65% | 63% |
|  | 130° C. | 67% | 67% |
|  | 210° C. | 71% | 70% |
|  | 250° C. | 75% | 75% |

Thus, the present inventors have carried out various investigations as to protection of crystal water or adhesion water of an inorganic pigment such as alumina hydrate or silica from the oxidizing action of ozone gas. As a result, it has been found that a water molecule becomes hard to be affected by external factors, for example, actions of heat, gases and light when the water molecule is taken in a structure of an amorphous body rather than a crystal. On the basis of this fact, a technique of using an inorganic pigment such as alumina hydrate or silica, on the surface of which an amorphous body formed by a divalent or higher-valent metal and an anion component exists, has been created, thereby completing the present invention. According to the surface-modified inorganic pigment of the present invention, a water molecule existing on the surface of the inorganic pigment such as alumina hydrate or silica can be caused to stably exist by inclusion or capture by the amorphous body, so that it is considered that the water molecule is protected from the oxidizing action by ozone gas to produce no active radical.

Figure 8A:
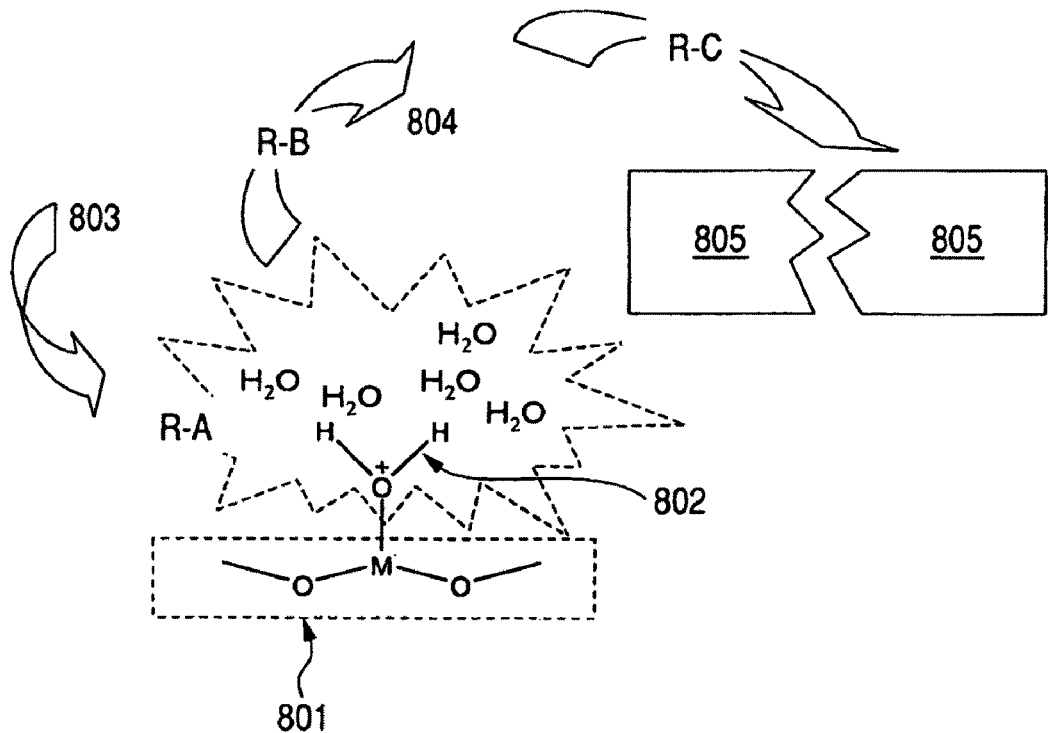
FIGS. 8A and 8B typically illustrate an image of the mechanism of the present invention, wherein FIG. 8A images the surface condition of a surface-unmodified inorganic pigment when affected by ozone gas, and FIG. 8B images the surface condition of a surface-modified inorganic pigment when affected by ozone gas.
Figure 8B:
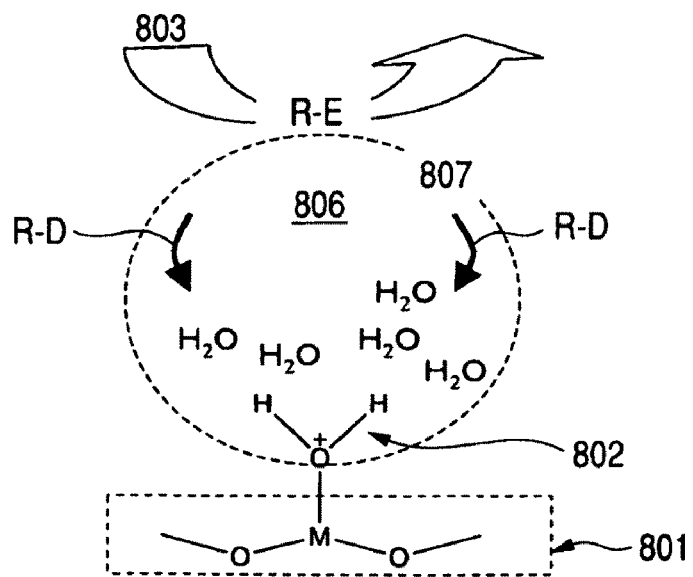

FIGS. 8A and 8B illustrate an image of the mechanism of the present invention. FIG. 8A illustrates the case where a surface-unmodified inorganic pigment is used, and a water molecule (802) adheres or adsorbs on an acid point existing on the surface of the inorganic pigment (801). When ozone gas (803) acts on this water molecule (802), a radical (804) is produced (R-B), and the radical (804) attacks an organic substance (805) to decompose (R-C) the organic substance (805). On the other hand, FIG. 8B illustrates the case where the surface-modified inorganic pigment according to the present invention is used, and a water molecule (802) adheres or adsorbs on an acid point existing on the surface of the inorganic pigment (801). However, the water molecule (802) is included or captured (R-D) by an amorphous body (806) formed by a divalent or higher-valent metal and an anion component, thereby forming a hydrate (807). It is considered that the water molecule (802) existing on the surface of the inorganic pigment (801) is held in a stable state in this manner, so that the water molecule is not affected (R-E) by the ozone gas (803) to produce no radical (804), whereby an organic substance is not decomposed.

The inorganic pigment having acid function used in the present invention is an inorganic pigment having an acid point on the surface thereof. Examples of such an inorganic pigment include $SiO_2$, $ZnO$, $Al_2O_3$, $ZrO_2$, $SnO_2$, $TiO_2$, $SiO_2$—$Al_2O_3$, $SiO_2$—$TiO_2$, $SiO_2$—$MgO$, $ZrO_2/nH_2O$, $TiO_2/nH_2O$ and $Al_2O_3/nH_2O$. Here, "acid function" means that having an active acid point and is represented as a Lewis acid point or Brønsted acid point. It has been found that when the acid point having acid function exists on the surface of the inorganic pigment, an organic compound such as a coloring material exhibits a tendency of easily gathering in a state of aggregation or association in the vicinity of the acid point. Therefore, the organic compound such as the coloring material adsorbs on the inorganic pigment as if it were a pigment, so that the adsorbability of the organic compound such as the coloring material is easy to be improved.

Among these inorganic pigments, a bifunctional inorganic pigment is favorably used when the inorganic pigment is used as an adsorbent for coloring materials. Here, the bifunctional inorganic pigment is an inorganic pigment having both acid point and base point. Examples of the bifunctional inorganic pigment include $Al_2O_3$, $Al_2O_3/nH_2O$, $ZrO_2$, $SiO_2$—MgO and $TiO_2$. The inorganic pigment has the base point, whereby not only the adsorbability of the coloring material is improved, and the fastness thereof is improved, but also such an inorganic pigment has an effect to improve the coloring ability of the coloring material because the coloring material adsorbs thereon in a state of an isolated molecule.

Figure 17:
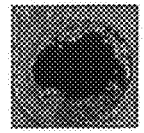
FIG. 17 illustrates the results of comparison when silica having only an acid point having acid and alumina hydrate (boehmite) having bifunctionality were used as the inorganic pigments having acid used in the present invention, and a copper phthalocyanine dye was applied to these pigments.

FIG. 17 shows the results of comparison when silica having only an acid point having acid function and alumina hydrate (boehmite) having bifunctionality were used as the inorganic pigments having acid function used in the present invention, and a copper phthalocyanine dye was applied to these pigments. Incidentally, "Ini" in the FIG. 17 shows a state before exposure to ozone. A surface-modified sample of the alumina hydrate having bifunctionality is higher in dye application concentration before exposure to ozone and also higher in retention of dye application concentration after exposure to ozone than a surface-modified sample of the silica. When the surface-unmodified boehmite and silica were compared, the same results as the surface modified pigments were obtained. It is also known that in both boehmite and silica, the dye application concentration before exposure to ozone and retention of dye application concentration after exposure to ozone become high when these pigments are surface-modified. In other words, it is known that the alumina hydrate having bifunctionality is apparently better.

Among the bifunctional inorganic pigments, alumina hydrate is particularly favorable. The alumina hydrate is not only high in surface activity, but also easy to be formed into fine particles, so that its surface area can be made high to achieve a high adsorption when an organic compound such as a coloring material is adsorbed thereon. No particular limitation is imposed on the alumina hydrate so far as it has a hydroxyl group, and any of those prepared by different production conditions such as those produced by a vapor-phase method and a liquid-phase method, and those different in dispersed state such as those of powdered form and colloidal form may be used.

The alumina hydrate may be represented by the following general formula (X).

$$Al_2O_{3-n}(OH)_{2n} \cdot mH_2O \qquad (X)$$

In the formula (X), n is any of 1, 2 and 3, m is a number falling within a range of from 0 to 10, favorably from 0 to 5, with the proviso that m and n are not 0 at the same time. In many cases, $mH_2O$ represents an aqueous phase which does not participate in the formation of a crystal lattice but can be eliminated. Therefore, m may take an integer or a value other than integers. When this kind of a material is heated, m may reach a value of 0 in some cases.

It is known that the crystal structure of the alumina hydrate is transformed from aluminum hydroxide of the amorphous, gibbsite, pseudoboehmite or boehmite type to aluminum oxide of the γ, σ, η, θ or α type according to the temperature of a heat treatment. In the present invention, that having any of these crystal structures may be used. The alumina hydrate suitable for use in the present invention is an alumina hydrate having a beohmite structure or amorphous structure when analyzed by the X-ray diffractometry, and examples thereof include the alumina hydrates having a pseudoboehmite structure and described in Japanese Patent Application Laid-Open Nos. H07-232473, H08-132731, H09-066664 and H09-076628 in particular.

The pore physical properties of the alumina hydrate are adjusted in the course of the production thereof. For example, when the alumina hydrate is used as an adsorbent for coloring materials in the form of a solid or in a coloring-material-receiving layer including the form of the solid, an alumina hydrate having a pore volume of 0.3 to 1.0 mL/g, favorably 0.35 to 0.9 mL/g, is favorably used. With respect to the BET specific surface area determined by the BET method, an alumina hydrate having a BET specific surface area of 50 to 350 $m^2/g$, favorably 100 to 250 $m^2/g$, is favorably used. The BET method is a surface area measuring method of powder by a vapor-phase adsorption method and a method for determining an overall surface area of 1 g of a sample, i.e., a specific surface area, from an adsorption isothermal curve. In general, nitrogen gas is often used as a gas to be adsorbed, and a method in which an amount adsorbed is measured from a change of the pressure or volume of the gas to be adsorbed is most often used. The most famous equation representing an isothermal curve of polymolecular adsorption is the Brunauer-Emmett-Teller equation, called a BET equation and widely used in determination of a surface area. An amount adsorbed is found on the basis of the BET equation, and this value is multiplied by an area occupied by an adsorbed molecule on the surface to determine the surface area.

The form of the alumina hydrate is favorably a flat plate form having an average aspect ratio of 3 to 10 and a length/width ratio in the flat plate surface of 0.6 to 1.0. The aspect ratio can be determined according to the method defined in Japanese Patent Publication No. H05-016015. The aspect ratio is expressed by a ratio of "diameter" to "thickness" of a particle. The term "diameter" as used herein means the diameter of the circle having an area equal to a projected area of the particle, which has been obtained by observing the alumina hydrate through a microscope or electron microscope. The length/width ratio in the flat plate surface is a ratio of a minimum diameter to a maximum diameter of the flat plate surface when observed in the same manner as in the aspect ratio. When an alumina hydrate having an average aspect ratio outside the above range is used, there is a possibility that the pore distribution range of a coloring-material-receiving layer formed with such an alumina hydrate may become narrow. When that exceeding the above range is used, there is a possibility that it may be difficult to produce such an alumina hydrate with a uniform particle size. When an alumina hydrate having a length/width ratio outside the above range is used, the pore distribution range of a coloring-material-receiving layer becomes narrow likewise.

As also described in literature [Rocek J., et al., Applied Catalysis, Vol. 74, pp. 29-36 (1991)], it is generally known that alumina hydrates include those having a ciliary form and those having another form. According to the finding by the present inventors, an alumina hydrate having a flat plate form has better dispersibility than that having a ciliary form even when the alumina hydrates are those of the same kind. In the case of the alumina hydrate having the ciliary form, there is a tendency to be oriented in parallel with the surface of a primer layer upon the coating thereof, so that the ink absorbency of the resulting coloring-material-receiving layer may be lowered in some cases. On the other hand, when the alumina hydrate having the flat plate form is used, the tendency to be oriented by coating is low, so that the pore size and ink absorbency of a coloring-material-receiving layer to be formed are only slightly affected.

Favorable divalent or higher-valent metals and anion components used in the present invention will now be described.

All divalent or higher-valent metals in the periodic table may be selected as the divalent or higher-valent metal. However, such a metal is favorably selected from alkaline earth metals (calcium, magnesium, strontium, barium and radium). In order to interact with a water molecule existing on the surface of the inorganic pigment such as alumina hydrate or silica, it is favorable to form a bonding state with an oxygen atom in the water molecule existing on the surface of the inorganic pigment such as alumina hydrate or silica. Therefore, this is the reason why the alkali earth metal, which is a metal low in electronegativity to the oxygen atom, is selected.

The anion component is favorably an anion capable of forming a salt with a divalent or higher-valent metal and forming a hydrate represented by crystal water or adhesion water because a water molecule of particles of the alumina hydrate or porous alumina hydrate may not be included or captured in some cases if no hydrate is formed. For example, an organic acid ion such as an acetate ion and oxalate ion, an inorganic acid ion such as a sulfate ion, nitrate ion, carbonate ion, halide ion and hydroxide ion may be suitably used. Among these, the organic acid ion is particularly favorable.

The molar ratio between the divalent or higher-valent metal and anion component making up the amorphous body contained in the surface-modified inorganic pigment according to the present invention is arbitrary so far as the amorphous body can be formed. However, the ratio is generally a stoichiometric ratio. Accordingly, for example, a salt formed by the divalent or higher-valent metal and the anion component may be used as a raw material to form the amorphous body.

The amorphous body contained in the surface-modified inorganic pigment according to the present invention is formed by at least the divalent or higher-valent metal and the anion component, and that formed by further combining a water molecule is favorable. The molar ratio of the water molecule is arbitrary so far as the amorphous body can be formed. Accordingly, for example, a monohydrate to hexahydrate of a salt formed by the divalent or higher-valent metal and the anion component may be used as a raw material to form the amorphous body.

The mass ratio between the inorganic pigment having acid function and the amorphous body contained in the surface-modified inorganic pigment according to the present invention is arbitrary so far as the surface-modified inorganic pigment is in a state of exhibiting no acid. function The surface-modified inorganic pigment according to the present invention can be produced by a process having a step of applying a divalent or higher-valent metal salt hydrate to an inorganic pigment having acid function and a step of causing the divalent or higher-valent metal salt hydrate applied to exist as an amorphous body.

Examples of a method for applying the divalent or higher-valent metal salt hydrate to the inorganic pigment having acid function include a method of mixing the divalent or higher-valent metal salt hydrate and the inorganic pigment having acid function in a solid state, and a method of mixing these components in a state of slurry in a dispersion medium using a stirrer. A pH adjustor such as any of various kinds of acids or alkalis, and a dispersion stabilizer such as a nonionic surfactant or anionic surfactant may be added as needed. After the mixing, the resultant mixture may be dried as needed. A spray-drying device is favorably used in the drying.

No particular limitation is imposed on a method for causing the divalent or higher-valent metal salt hydrate applied to exist as the amorphous body. However, a method of baking the mixture obtained by mixing the inorganic pigment having acid function and the divalent or higher-valent metal salt hydrate at such a temperature that the divalent or higher-valent metal salt hydrate exists in an amorphous state is favorable.

Methods for baking the mixture include a method using an oven and a spray-drying method. However, the spray-drying method is favorable for causing the amorphous body of the divalent or higher-valent metal salt hydrate to exist in a nearly uniform state on the inorganic pigment having acid function. The heating temperature in spray-drying, i.e., environmental temperature (gas-phase temperature), is a baking temperature at which the divalent or higher-valent metal salt hydrate is changed from a crystal to an amorphous body, i.e., a temperature at which the divalent or higher-valent metal salt hydrate used can exist in an amorphous state. The heating conditions can be determined by studying baking temperatures at which the divalent or higher-valent metal salt hydrate, when varying the heating temperature conditions, changes to the amorphous state, by means of X-ray diffraction. For example, inorganic pigments having acid produced by changing the environmental temperature are subjected to XRD measurement, whereby the baking temperature can be determined. It is efficient that the relation between temperature and crystalline state for a divalent or higher-valent metal salt hydrate used is studied in advance by XRD, and then the baking is conducted at a temperature at which the divalent or higher-valent metal salt hydrate can exist as an amorphous body or anhydrous salt crystal precursor.

The temperature at which the divalent or higher-valent metal salt hydrate is baked and changed to a favorable amorphous state is favorably a temperature within a range of transforming from a monohydrate to an anhydride. In other words, it is favorable to apply thermal energy in such a temperature region as to achieve an amorphous state present during the course where the divalent or higher-valent metal salt hydrate applied is transformed from a monohydrate to an anhydride to form an amorphous state. For example, it is a temperature region within the range of (302) illustrated in FIG. 3.

Figure 12:
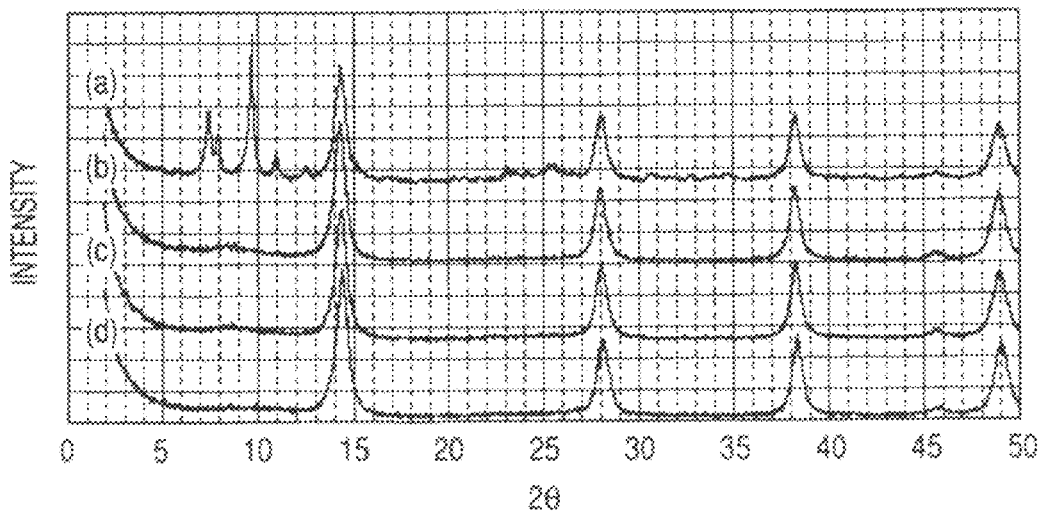
FIG. 12 diagrammatically illustrates profiles obtained by conducting X-ray diffraction measurement as to a mixture (C), wherein (a) to (c) are charts of samples obtained by baking for 2 hours in ovens of 210° C., 170° C. and 130° C., respectively, and (d) is a chart of an unbaked sample.

FIG. 12 illustrates the results of X-ray diffraction in the case where the inorganic pigment having acid function was boehmite, and magnesium acetate hydrate was used as the divalent or higher-valent metal salt hydrate and when the baking was conducted at varied temperatures after drying by a spray-drying device. In FIG. 12, (a) to (c) are charts of samples obtained by baking for 2 hours in ovens of 210° C., 170° C. and 130° C., respectively, and (d) is a chart of an unbaked sample. Such a sharp peak of (301) observed at a low baking temperature as illustrated in FIG. 3 did not appear even in the unbaked sample, because the mixture was dried by means of the spray-drying device. According to this method, not only the process for producing the surface-modified inorganic pigment according to the present invention is simplified, but also a broad peak can be caused to exist on a lower baking temperature side compared with the case of FIG. 3.

The colored surface-modified inorganic pigment according to the present invention is that obtained by coloring the surface of the surface-modified inorganic pigment with a coloring agent. Since this colored surface-modified inorganic pigment is hard to produce a radical for decomposing the coloring agent, the fastness thereof is remarkably improved compared with that obtained by coloring a conventional inorganic pigment having acid function.

As the coloring agent, there may be used any of dyes such as direct dyes, acid dyes, basic dyes, vat dyes and dyes containing a metal complex such as phthalocyanine, and various kinds of pigments. Among these coloring agents, a dye is favorably used because the effects of the present invention can be effectively achieved, and moreover good coloring can be achieved.

The amount of the coloring agent applied to the surface-modified inorganic pigment cannot be generally described, because the colored condition with the coloring agent such as a coloring material varies according to the surface area and surface-modifying property of the surface-modified inorganic pigment. However, the amount is within a range of favorably at most 15% by mass or less, more favorably 10% by mass or less, still more favorably 10% by mass or less. The effects of the present invention are not affected by lessening the amount of the coloring agent used though the coloring density becomes thin.

The colored surface-modified inorganic pigment can be produced by a production process having a step of applying a coloring-agent-containing solution to the surface-modified inorganic pigment, and a step of drying the surface-modified inorganic pigment to which the coloring-agent-containing solution has been applied with thermal energy by which the amorphous body contained in the surface-modified inorganic pigment is not transformed into a crystal.

A solvent for preparing the coloring-agent-containing solution may be any solvent so far as it can dissolve or disperse a coloring material, and the surface-modified inorganic pigment is dispersed therein. For example, water is favorably used. Methods for applying the coloring-agent-containing solution to the surface-modified inorganic pigment includes a method of mixing the coloring-agent-containing solution and the surface-modified inorganic pigment, and a method of applying the coloring-agent-containing solution to the surface-modified inorganic pigment by spraying. As a method for drying, there may be used convection, conduction or radiant heat. The drying temperature may be selected from a temperature region in which the amorphous body contained in the surface-modified inorganic pigment is not transformed into a crystal by conducting such an analysis by X-ray diffraction method as described above in advance. It is only necessary to conduct drying by applying thermal energy within the above-described temperature region to the surface-modified inorganic pigment to which the coloring agent-containing solution has been applied.

The recording medium according to the present invention is a recording medium in which a coloring-material-receiving layer formed on a substrate has an inorganic pigment, wherein the inorganic pigment is the above-described surface-modified inorganic pigment.

As the substrate, may be used a water-absorbable fibrous substance (for example, wood pulp), paper such as suitably sized paper, unsized paper or resin-coated paper making use of polyethylene or the like, a sheet-like substance such as a thermoplastic film, or cloth, and no particular limitation is imposed on the substrate. The coloring-material-receiving layer may be provided on one surface or both surfaces of the substrate. The coloring-material-receiving layer is provided so as to give a coating weight of favorably 0.5 to 60 g/m$^2$, more favorably 5 to 45 g/m$^2$ in terms of dry solid content.

The coloring-material-receiving layer is only required to contain the above-described surface-modified inorganic pigment as a coloring-material-receiving layer. The content of the surface-modified inorganic pigment in the coloring-material-receiving layer is favorably 50% by mass or more, more favorably 70% by mass or more, still more favorably 80% by mass or more and 99.0% by mass or less in terms of solid content. The coloring-material-receiving layer generally contains a binder in addition to the surface-modified inorganic pigment and favorably contains a crosslinking agent.

In particular, the inorganic pigment having acid, which is contained in the surface-modified inorganic pigment, is favorably porous alumina hydrate. The recording medium with such a surface-modified inorganic pigment contained in the coloring-material-receiving layer can remarkably improve ozone resistance. In other words, the production of an active radical which decomposes the coloring material in the coloring-material-receiving layer is inhibited, so that the ozone resistance of the coloring material can be improved.

Polyvinyl alcohol is favorably used as the binder. Besides, conventionally known binders, such as modified products of polyvinyl alcohol, starch or modified products thereof, gelatin or modified products thereof, casein or modified products thereof, gum arabic, cellulose derivatives such as carboxymethyl cellulose, hydroxyethyl cellulose and hydroxypropylmethyl cellulose, conjugated diene copolymer latexes such as SBR latexes, NBR latexes and methyl methacrylate-butadiene copolymers, functional group-modified polymer latexes, vinyl copolymer latexes such as ethylene-vinyl acetate copolymers, polyvinyl pyrrolidone, maleic anhydride polymers or copolymers thereof, and acrylic ester copolymers may also be used. These binders may be used either singly or in any combination thereof. It is also favorable to use polyvinyl alcohol in combination with conventionally known binder(s).

The mixing ratio of the surface-modified inorganic pigment to the binder in the coloring-material-receiving layer is favorably within a range of from 1:1 to 100:1 in terms of mass ratio. When the amount of the binder falls within the above range, the pore volume suitable for application of an image fading-preventing agent to the coloring-material-receiving layer can be retained.

The crosslinking agent is favorably at least one selected from the group consisting of aldehyde type compounds, melamine type compounds, isocyanate type compounds, zirconium compounds, amide type compounds, aluminum compounds, boric acid and borates. The content of the crosslinking agent in the coloring-material-receiving layer may be in a general range described in publicly known literatures.

The coloring-material-receiving layer may further contain a pH adjustor, a flowability modifier, a surfactant, an antifoaming agent, a water-proofing agent, a parting agent, a fluorescent brightener, an ultraviolet absorbent and an antioxidants as needed.

The recording medium according to the present invention can be produced by a process having a step of forming a coloring-material-receiving layer containing the surface-modified inorganic pigment on a substrate, and a step of drying the coloring-material-receiving layer with thermal energy by which the amorphous body contained in the surface-modified inorganic pigment is not transformed into a crystal.

The formation of the coloring-material-receiving layer can be conducted by applying a coating liquid containing a component forming such a coloring-material-receiving layer as described above on to the substrate by means of a coater and drying the coating liquid applied. As the coating method, there may be used a coating technique by a blade coater, air knife coater, roll coater, brush coater, curtain coater, bar coater, gravure coater or sprayer. After the coating, the surface smoothness of the coloring-material-receiving layer may be improved by using a calendering roll as needed.

The drying temperature for drying the coloring-material-receiving layer may be selected from a temperature region in which the amorphous body contained in the surface-modified inorganic pigment is not transformed into a crystal by conducting such an analysis by X-ray diffraction method as described above in advance. It is only necessary to conduct drying by applying thermal energy within the above-described temperature region to the surface-modified inorganic pigment to which the coloring agent-containing solution has been applied.

The recording medium according to the present invention may be subjected to a surface-glossing treatment as needed. As the glossing treatment on the surface of the coloring-material-receiving layer, there is favorably used a casting method in which an object to be treated in a wet state is brought into contact under pressure with a specular drum the surface of which has been heated to dry the object. The casting method includes a direct method, gelling method and rewet method. The rewet method is particularly favorable in the present invention.

The direct method is a method in which the surface of the coloring-material-receiving layer applied on to the substrate is brought into contact under pressure with a specular drum the surface of which has been heated upon the formation of the coloring-material-receiving layer while the coloring-material-receiving layer is yet in a wet state, thereby conducting a drying treatment. The gelling method is a method in which the coloring-material-receiving layer on the substrate is brought into contact with a gelling agent bath upon the formation of the coloring-material-receiving layer while the coloring-material-receiving layer is yet in a wet state, thereby gelling this layer, and the surface of this layer is then brought into contact under pressure with a specular drum, the surface of which has been heated, thereby conducting a drying treatment. The rewet method is a method in which the coating liquid is applied on to a substrate and dried according to a method known per se in the art to form a coloring-material-receiving layer once, the coloring-material-receiving layer is treated again with hot water to return the coloring-material-receiving layer to a wet state and swell it, and the coloring-material-receiving layer in the swollen state is brought into contact under pressure with a specular drum the surface of which has been heated, thereby conducting a drying treatment. The coloring-material-receiving layer in the wet state is brought into contact under pressure with a heated drum, whereby high gloss can be imparted to the surface of the coloring-material-receiving layer while retaining the porous structure of the coloring-material-receiving layer. Since the coloring-material-receiving layer is re-swollen after it is dried once, the amount of water evaporated from a back side when brought into contact under pressure with the specular drum becomes small. Thus, according to this method, the substrate used is less limited, and the glossing treatment becomes feasible even when the coloring-material-receiving layer is provided on a dense substrate.

The glossiness of a surface on the side of the coloring-material-receiving layer of the thus-obtained recording medium can be controlled so as to be 20% or more as measured at 20°. Such control is favorable in that the formation of a high-quality image becomes feasible in ink-jet recording. The glossiness in the present invention is a value measured according to the method prescribed in JIS Z 8741.

The image forming method according to the present invention comprises applying a recording liquid to a recording medium in which a coloring-material-receiving layer containing the above-described surface-modified inorganic pigment is formed on a substrate, thereby forming an image. As a method for applying the recording liquid, a non-contact recording system in which the liquid is applied to the recording medium without contact is favorable. For example, an ink jet recording method is mentioned. In the case of a contact recording system in which recording is conducted by contacting with the recording medium, for example, a method using a ball-point pen, there is a high possibility that the amorphous body existing in the recording medium according to the present invention may be destroyed.

The recorded image according to the present invention is obtained by forming an image on a recording medium in which a coloring-material-receiving layer formed on a substrate contains the above-described surface-modified inorganic pigment, with a coloring agent. A favorable coloring agent is a non-crystalline coloring material. When the coloring agent is crystalline, there is a possibility that the amorphous body in the present invention may migrate to the crystal surface of the coloring agent. In this case, the surface-modified state of the inorganic pigment in the recording medium is changed to easily reduce the effects of the present invention. Incidentally, the non-crystalline coloring material is generally classified into a dye, not into an inorganic or organic pigment. Such a coloring material may be either water-soluble or water-insoluble.

Incidentally, the surface-modified inorganic pigment according to the present invention may be used as a pigment dispersion dispersed in a dispersion medium. This pigment dispersion may be used as a coating liquid for forming a coloring-material-receiving layer of, for example, a recording medium for ink jet recording. A recording medium excellent in gas resistance or light resistance may be provided by using the above-described pigment dispersion.

The pigment dispersion favorably contains a dispersion medium such as water and the above-descried binder in addition to the surface-modified inorganic pigment according to the present invention. A dispersant for dispersing the inorganic pigment and other additives may also be added as needed. The use of the dispersant permits easily deflocculating the inorganic pigment to obtain a uniform dispersion. In general, an acid may be used as the dispersant. Among others, organic acids such as acetic acid, formic acid and oxalic acid, and inorganic acids such as nitric acid, hydrochloric acid and sulfuric acid are favorable. Examples of the other additives include crosslinking agents, thickeners, pH adjustors, lubricants, flowability modifiers, surfactants, antifoaming agents, water-proofing agents, parting agents, fluorescent brighteners, ultraviolet absorbents and antioxidants.

EXAMPLES

The present invention will hereinafter be described more specifically by the following Examples and Comparative Examples. However, the present invention is not limited to these examples.

Investigation on Mixture (A) of Alumina Hydrate and Magnesium Acetate Hydrate

[Mixture-Preparing Step A: Preparation of Surface-Modified Inorganic Pigment Sample Precursor]

Alumina hydrate (trade name: DisperaL HP-14, product of SasoL Co.) that is a commercially available inorganic pigment was used as an inorganic pigment having acid function and magnesium acetate tetrahydrate was added as a component for forming an amorphous body to an aqueous solution of the alumina hydrate. The amount of the magnesium acetate tetrahydrate added was such that the Mg element amounts to 20% by mass based on the Al element in the alumina hydrate. Thereafter, the resultant mixture was sufficiently stirred and mixed to obtain a mixture [A] using a spray-drying device. The drying temperature (gas-phase temperature) was controlled to 170° C.

[Surface Observation a of Mixture: Observation of Surface Condition of Surface-Modified Inorganic Pigment Sample Precursor]

Figure 13:
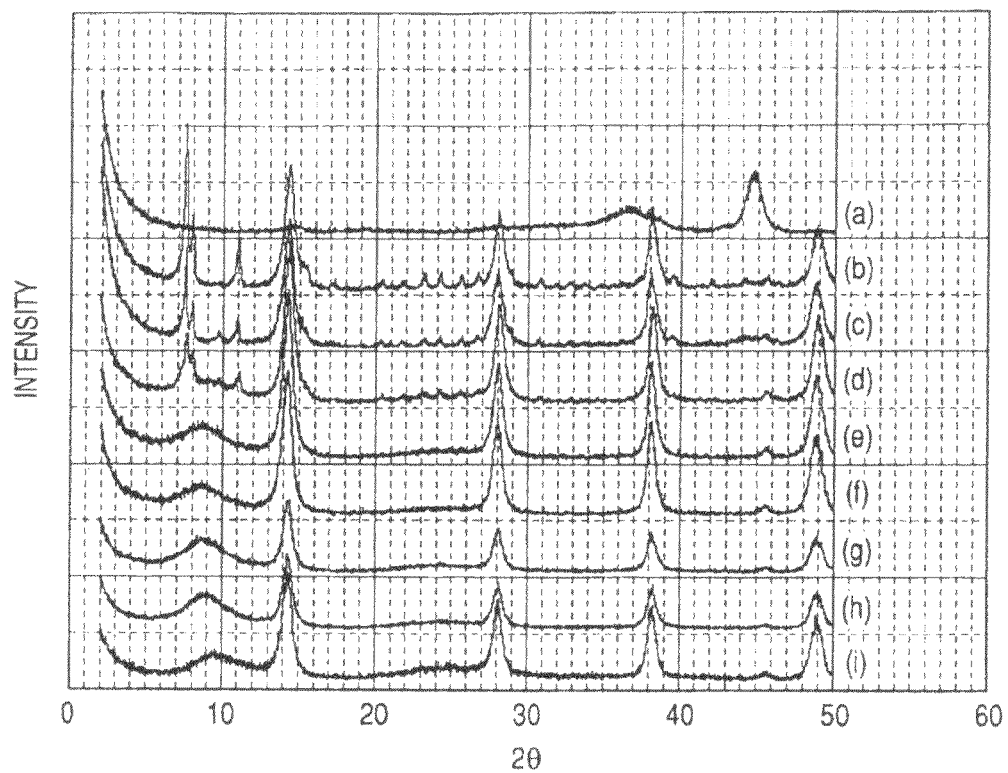
FIG. 13 diagrammatically illustrates profiles obtained by conducting X-ray diffraction measurement as to a mixture (A), wherein (a) to (h) are charts of samples obtained by baking for 2 hours in ovens of 330° C., 290° C., 250° C., 210° C., 170° C., 130° C., 105° C. and 97° C., respectively, and (i) is a chart of an unbaked sample.

In order to study the surface condition of the mixture (A) obtained above, the presence of an amorphous body when varying the baking temperature was studied by an X-ray diffraction (XRD) method using CuKα manufactured by Rigaku Co. With respect to measuring conditions, the range of measuring 2θ (A) was from 2° to 50°. The results are illustrated in FIG. 13. In FIG. 13, (a) to (h) are charts of samples obtained by baking for 2 hours in ovens of 330° C., 290° C., 250° C., 210° C., 170° C., 130° C., 105° C. and 97° C., respectively, and (i) is a chart of an unbaked sample.

From FIG. 13, a broad peak indicating the presence of the amorphous body derived from magnesium acetate (divalent or higher-valent metal and anion component) could be identified in a 2θ range of from about 5° to about 10° in the unbaked sample and the samples obtained by baking at 97° C., 105° C., 130° C. and 170° C. A sharp peak indicating the crystal of magnesium acetate and a broad peak derived from magnesium acetate were detected overlapping each other in a 2θ range of from about 5° to about 10° in the sample obtained by baking at 210° C. A sharp peak indicating the crystal of magnesium acetate could be identified in a 2θ range of from about 5° to about 10° in the samples obtained by baking at 250° C. and 290° C. Neither a sharp peak indicating the crystal of magnesium acetate nor a broad peak derived from magnesium acetate could be identified in a 20 range of from about 5° to about 10° in the sample obtained by baking at 330° C., and a peak of boehmite varnished, and so it was confirmed that the crystal structure of boehmite was destroyed.

The unbaked sample, and the samples obtained by baking at 97° C., 105° C., 130° C., 170° C. and 210° C., in which the presence of the amorphous body could be identified by the XRD measurement, were subjected to X-ray photoelectron spectroscopy (XPS). As a result, the positions of peaks caused by bondings of 2p of Al making up the surface-modified inorganic pigment, 1s of oxygen and is of carbon were not different in all the samples, and so their surface conditions were not different. Accordingly, in the above samples in which the presence of the amorphous body could be identified, it is concluded that the inorganic pigment and amorphous body contained in the surface-modified inorganic pigment do not chemically bond to each other.

From the results of the mixture-preparing step A and the surface observation A, surface-modified inorganic pigments of the following Examples A-1 to A-6 and inorganic pigments of the following Comparative Examples A-1 to A-3 were prepared.

Example A-1

An unbaked product of the mixture (A) was provided as a surface-modified inorganic pigment sample of Example A-1.

Example A-2

The mixture (A) was put in a crucible which was then put in an oven of 97° C. for 2 hours to bake the mixture, thereby providing a surface-modified inorganic pigment as a sample for Example A-2.

Example A-3

The mixture (A) was put in a crucible which was then put in an oven of 105° C. for 2 hours to bake the mixture, thereby providing a surface-modified inorganic pigment as a sample for Example A-3.

Example A-4

The mixture (A) was put in a crucible which was then put in an oven of 130° C. for 2 hours to bake the mixture, thereby providing a surface-modified inorganic pigment as a sample for Example A-4.

Example A-5

The mixture (A) was put in a crucible which was then put in an oven of 170° C. for 2 hours to bake the mixture, thereby providing a surface-modified inorganic pigment as a sample for Example A-5.

Example A-6

The mixture (A) was put in a crucible which was then put in an oven of 210° C. for 2 hours to bake the mixture, thereby providing a surface-modified inorganic pigment as a sample for Example A-6.

Comparative Example A-1

The mixture (A) was put in a crucible which was then put in an oven of 250° C. for 2 hours to bake the mixture, thereby providing a surface-modified inorganic pigment as a sample for Comparative Example A-1.

Comparative Example A-2

The mixture (A) was put in a crucible which was then put in an oven of 290° C. for 2 hours to bake the mixture, thereby providing a surface-modified inorganic pigment as a sample for Comparative Example A-2.

Comparative Example A-3

The mixture (A) was put in a crucible which was then put in an oven of 330° C. for 2 hours to bake the mixture, thereby providing a surface-modified inorganic pigment as a sample for Comparative Example A-3.

Comparative Example A-4

An operation was conducted in the same manner as in the mixture-preparing step A except that magnesium acetate tetrahydrate was not added in the mixture-preparing step A, thereby providing powder (J) of alumina hydrate as a sample for Comparative Example A-4.

Figure 14:
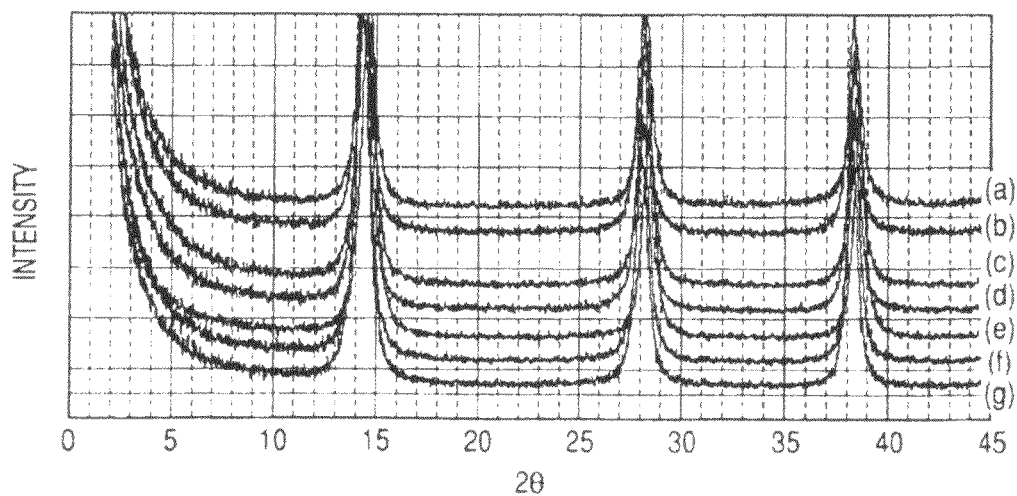
FIG. 14 diagrammatically illustrates profiles obtained by conducting X-ray diffraction measurement as to powder (J) of alumina hydrate, wherein (a) to (f) are charts of samples obtained by baking for 2 hours in ovens of 330° C., 290° C., 250° C., 210° C., 170° C. and 130° C., respectively, and (g) is a chart of an unbaked sample.

The thus-obtained powder (J) of alumina hydrate was observed by X-ray diffraction in the same manner as in the surface observation A of the mixture. Charts obtained by X-ray diffraction (XRD) measurement are illustrated in FIG. 14. In FIG. 14, (a) to (f) are charts of samples obtained by baking for 2 hours in ovens of 330° C., 290° C., 250° C., 210° C., 170° C. and 130° C., respectively, and (g) is a chart of an unbaked sample. The presence of the amorphous body could not be identified in the respective samples obtained by baking in the ovens of 330° C., 290° C., 250° C., 210° C., 170° C. and 130° C.

From the above results, inorganic pigments of the following Comparative Examples A-5 and A-6 were prepared.

Comparative Example A-5

The powder (J) of alumina hydrate was put in a crucible which was then put in an oven of 130° C. for 2 hours to bake the powder, thereby providing a sample for Comparative Example A-5.

Comparative Example A-6

The powder (J) of alumina hydrate was put in a crucible which was then put in an oven of 170° C. for 2 hours to bake the powder, thereby providing a sample for Comparative Example A-6.

Comparative Example A-7

An operation was conducted in the same manner as in the mixture-preparing step A except that acetic acid was used in place of magnesium acetate tetrahydrate in the mixture-preparing step A, thereby providing powder (K) of alumina hydrate as a sample for Comparative Example A-7.

The thus-obtained powder (K) of alumina hydrate was observed by X-ray diffraction in the same manner as in the surface observation A of the mixture. As a result, the same results as the charts obtained by X-ray diffraction (XRD) measurement in FIG. 14 were yielded. The presence of the amorphous body could not be identified from FIG. 14

From the above results, inorganic pigments of the following Comparative Examples A-8 and A-9 were prepared.

Comparative Example A-8

The powder (K) of alumina hydrate was put in a crucible which was then put in an oven of 130° C. for 2 hours to bake the powder, thereby providing a sample for Comparative Example A-8.

Comparative Example A-9

The powder (K) of alumina hydrate was put in a crucible which was then put in an oven of 170° C. for 2 hours to bake the powder, thereby providing a sample for Comparative Example A-9.

The samples of Examples A-1 to A-6 and Comparative Examples A-1 to A-9 were used to make the following evaluations.

(Evaluation of Acid)

With respect to the resultant samples, their acid point intensities were studied by a temperature programmed desorption test (TPD) that studies the surface activity by using ammonia gas. As a result, the same results as 'b' illustrated in FIGS. 15 and 16 were obtained in the samples of Examples A-1 to A-6, and no acid point could be identified. The same results as 'a' illustrated in FIGS. 15 and 16 were obtained in the samples of Comparative Examples A-1 to A-9, and an acid point could be identified.

(Evaluation of Coloring Material Application Property)

Each of the resultant samples (1.5 g) was added to an aqueous solution of C.I. Direct Blue 199 as a dye component dissolved at a concentration of 0.0001% by mass, and mixed and stirred for 12 hours at ordinary temperature. Thereafter, the resultant mixture was centrifuged under conditions of 12,000 rpm to separate and collect a dye applied inorganic pigment, the thus-collected inorganic pigment was left to stand for 12 hours under an environment of 80° C. to remove water, and the dye applied inorganic pigment was powdered in a mortar. The thus-obtained dye applied powder (0.1 g) was subjected to a scattering reflectance spectrometer (product name: U-4000, manufactured by Hitachi Ltd.) to find the spectral intensity at an absorption wavelength of 610 nm, thereby making evaluation of coloring material adsorbability. The results are shown in Table 2.

(Evaluation of Ozone Resistance)

The coloring material applied sample (0.05 g) obtained in the evaluation of coloring material application property was left to stand for 4 hours in a container containing ozone gas at a concentration of 10 ppm. Thereafter, the coloring density of the coloring material was measured by means of a scattering reflectance spectrometer (product name: U-4000, manufactured by Hitachi Ltd.) to find the retention of the applied coloring material from the spectral intensity at an absorption wavelength of 610 nm. The results are shown in Table 2. From Table 2, Examples could yield better results in the evaluation of coloring material application property and the evaluation of ozone resistance than Comparative Examples.

TABLE 2

| | Evaluation of coloring material application property | | |
|---|---|---|---|
| | Spectral intensity at $\lambda = 610$ nm | Spectral intensity at $\lambda = 670$ nm | Evaluation of ozone resistance Retention (%) |
| Ex. A-1 | 429 | 421 | 106% |
| Ex. A-2 | 496 | 507 | 109% |
| Ex. A-3 | 623 | 630 | 91% |
| Ex. A-4 | 448 | 466 | 86% |
| Ex. A-5 | 423 | 433 | 90% |
| Ex. A-6 | 420 | 440 | 88% |
| Comp. Ex. A-1 | 325 | 354 | 85% |
| Comp. Ex. A-2 | 326 | 363 | 88% |
| Comp. Ex. A-3 | 296 | 321 | 83% |
| Comp. Ex. A-4 | 407 | 422 | 65% |
| Comp. Ex. A-5 | 416 | 432 | 67% |
| Comp. Ex. A-6 | 377 | 391 | 73% |
| Comp. Ex. A-7 | 405 | 416 | 84% |
| Comp. Ex. A-8 | 396 | 412 | 71% |
| Comp. Ex. A-9 | 384 | 396 | 75% |

Investigation on Mixture (B) of Alumina Hydrate and Magnesium Acetate Tetrahydrate
(Mixture-Preparing Step B: Preparation of Surface-Modified Inorganic Pigment Sample Precursor)

Alumina hydrate (trade name: DisperaL HP-14, product of SasoL Co.) that is a commercially available inorganic pigment was used as an inorganic pigment having acid function, and magnesium acetate tetrahydrate was added as a component for forming an amorphous body to an aqueous solution of the alumina hydrate. The amount of the magnesium acetate tetrahydrate added was such that the Mg element amounts to 20% by mass based on the Al element in the alumina hydrate. Thereafter, the resultant mixture was sufficiently stirred and mixed and then placed in a dryer under a temperature environment of about 80° C. to evaporate water, and the dried mixture was powdered in a mortar to obtain a mixture [B].

[Surface Observation B of Mixture: Observation of Surface Condition of Surface-Modified Inorganic Pigment Sample Precursor]

In order to study the surface condition of the mixture (B) obtained above, the presence of an amorphous body was studied by an X-ray diffraction (XRD) method using CuKα manufactured by Rigaku Co., by which the condition of a crystal can be observed while continuously heating. With respect to measuring conditions, the range of measuring 2θ was from 2° to 50°, and the heating rate was 2° C./min. The results are illustrated in FIG. 3.

From FIG. 3, a broad peak indicating the presence of the amorphous body derived from magnesium acetate (divalent or higher-valent metal and anion component) could be identified in a baking temperature range of from about 40° C. to about 250° C. and in a 2θ range of from about 5° to about 10°. A peak indicating the presence of the crystal of magnesium acetate monohydrate and a broad peak indicating the amorphous body derived from magnesium acetate could be identified in a baking temperature range of from about 40° C. to about 140° C. Only a broad peak indicating the amorphous body derived from magnesium acetate could be identified in a baking temperature range of from about 140° C. to about 230° C. A peak indicating the presence of the crystal of magnesium acetate anhydride and a broad peak indicating the amorphous body derived from magnesium acetate could be identified in a baking temperature range of from about 230° C. to about 250° C. Only a peak indicating the presence of the crystal of magnesium acetate anhydride could be identified at 250° C. or more, and all peaks derived from magnesium acetate varnished at about 320° C. or higher.

The samples at the baking temperatures at which the presence of the amorphous body derived from magnesium acetate (divalent or higher-valent metal and anion component) could be identified by the XRD measurement were subjected to X-ray photoelectron spectroscopy (XPS). As a result, the positions of peaks caused by bondings of 2p of Al making up the surface-modified inorganic pigment, 1s of oxygen and is of carbon were not different in all the samples, and so their surface conditions were not different. Accordingly, in the samples at the baking temperatures at which the presence of the amorphous body could be identified, it is concluded that the inorganic pigment and amorphous body contained in the surface-modified inorganic pigment do not chemically bond to each other.

From the results of the mixture-preparing step B and the surface observation B, surface-modified inorganic pigments of the following Examples B-1 to B-3 and an inorganic pigment of the following Comparative Example B-1 were prepared.

Example B-1

The mixture (B) was put in a crucible which was then put in an oven of 100° C. for 2 hours to bake the mixture, thereby providing a surface-modified inorganic pigment as a sample for Example B-1.

Example B-2

The mixture (B) was put in a crucible which was then put in an oven of 150° C. for 2 hours to bake the mixture, thereby providing a surface-modified inorganic pigment as a sample for Example B-2.

Example B-3

The mixture (B) was put in a crucible which was then put in an oven of 200° C. for 2 hours to bake the mixture, thereby providing a surface-modified inorganic pigment as a sample for Example B-3.

Comparative Example B-1

The mixture (B) was put in a crucible which was then put in an oven of 400° C. for 2 hours to bake the mixture, thereby providing a surface-modified inorganic pigment as a sample for Comparative Example B-1.

Comparative Example B-2

An operation was conducted in the same manner as in the mixture-preparing step B except that magnesium acetate tetrahydrate was not added in the mixture-preparing step B, thereby providing powder (L) of alumina hydrate as a sample for Comparative Example B-2.

The thus-obtained powder (L) of alumina hydrate was observed by X-ray diffraction in the same manner as in the surface observation B of the mixture. However, the amorphous body could not be identified irrespective of the baking temperature.

From the results of Comparative Example B-2, inorganic pigments of the following Comparative Examples B-3 and B-4 were prepared.

Comparative Example B-3

The powder (L) of alumina hydrate was put in a crucible which was then put in an oven of 150° C. for 2 hours to bake the powder, thereby providing a sample for Comparative Example B-3.

Comparative Example B-4

The powder (L) of alumina hydrate was put in a crucible which was then put in an oven of 200° C. for 2 hours to bake the powder, thereby providing a sample for Comparative Example B-4.

(Evaluation of Acid)

With respect to the resultant samples, their acid point intensities were studied by a temperature programmed desorption test (TPD) that studies the surface activity by using ammonia gas. As a result, the same results as 'b' illustrated in FIGS. 15 and 16 were obtained in the samples of Examples B-1 to B-3, and no acid point could be identified. The same results as 'a' illustrated in FIGS. 15 and 16 were obtained in the samples of Comparative Examples B-1 to B-4, and an acid point could be identified.

(Evaluation of Ozone Resistance)

Each of the samples (1.5 g) obtained in Examples B-1 to B-3 and Comparative Examples B-1 to B-4 was added to an aqueous solution of C.I. Direct Blue 199 as a dye component dissolved at a concentration of 0.0001% by mass, and mixed and stirred for 12 hours at ordinary temperature. Thereafter, the resultant mixture was centrifuged under conditions of 12,000 rpm to separate and collect a dye applied inorganic pigment. The dye applied inorganic pigment was then left to stand for 12 hours under an environment of 80° C. to remove water, and powdered in a mortar. The thus-obtained dye applied powder sample (0.1 g) was left to stand for 4 hours in a container containing ozone gas at a concentration of 10 ppm to visually evaluate change of the colored dye by exposure to ozone. The conditions thereof are shown collectively in FIG. 18.

Figure 18:
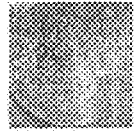
FIG. 18 illustrates the results of evaluation of ozone resistance with a mixture (B).

It is understood from FIG. 18 that the surface-modified inorganic pigments of Examples B-1 to B-3 were remarkably improved in ozone resistance compared with Comparative Examples B-1 to B-4. Example B-2 of the baking temperature of 150° C. and Example B-3 of the baking temperature of 200° C. are less in fading of the cyan color after the exposure to ozone compared to Example B-1 of the baking temperature of 100° C., and thus are better. In other words, the case where only the amorphous body exists without coexistence of the crystal of monohydrate can achieve better effects.

Investigation on Mixture (C) of Alumina Hydrate and Magnesium Acetate Tetrahydrate

[Mixture-Preparing Step C: Preparation of Surface-Modified Inorganic Pigment Sample Precursor]

An operation was conducted in the same manner as in the mixture-preparing step A except that the amount of the magnesium acetate tetrahydrate added in the mixture-preparing step A was changed to 5% by mass in terms of the Mg element based on the Al element in the alumina hydrate, thereby obtaining a mixture (C).

[Surface Observation C of Mixture: Observation of Surface Condition of Surface-Modified Inorganic Pigment Sample Precursor]

In order to study the surface condition of the mixture (C) obtained above, the presence of an amorphous body when varying the baking temperature was studied by an X-ray diffraction (XRD) method using CuKα manufactured by Rigaku Co. With respect to measuring conditions, the range of measuring 2θ (A) was from 2° to 50°. The results are illustrated in FIG. 12. In FIG. 12, (a) to (c) are charts of samples obtained by baking for 2 hours in ovens of 210° C., 170° C. and 130° C., respectively, and (d) is a chart of an unbaked sample. From FIG. 12, a broad peak indicating the presence of the amorphous body derived from magnesium acetate (divalent or higher-valent metal and anion component) could be identified at 2θ of a little less than 10° in the unbaked sample and the samples obtained by baking at 130° C. and 170° C.

The unbaked sample, and the samples obtained by baking at 210° C., 170° C. and 130° C., in which the presence of the amorphous body could be identified by the XRD measurement, were subjected to X-ray photoelectron spectroscopy (XPS). As a result, the positions of peaks caused by bondings of 2p of Al making up the surface-modified inorganic pigment, 1s of oxygen and 1s of carbon were not different in all the samples, and so their surface conditions were not different. Accordingly, in the above samples, in which the presence of the amorphous body could be identified, it is concluded that the inorganic pigment and amorphous body contained in the surface-modified inorganic pigment do not chemically bond to each other.

From the results of the mixture-preparing step C and the surface observation C, surface-modified inorganic pigments of the following Examples C-1 and C-2 were prepared.

Example C-1

An unbaked product of the mixture (C) was provided as a surface-modified inorganic pigment sample of Example C-1.

Example C-2

The mixture (C) was put in a crucible which was then put in an oven of 170° C. for 2 hours to bake the mixture, thereby providing a surface-modified inorganic pigment as a sample for Example C-2.

The samples of Examples C-1 and C-2, and Comparative Examples A-1 to A-9 were used to make the following evaluations.

(Evaluation of Acid)

With respect to the resultant samples, their acid point intensities were studied by a temperature programmed desorption test (TPD) that studies the surface activity by using ammonia gas. As a result, the same results as 'b' illustrated in FIGS. 15 and 16 were obtained in the samples of Examples C-1 and C-2, and no acid point could be identified.

(Evaluation of Coloring Material Application Property)

Each of the resultant samples (1.5 g) was added to an aqueous solution of C.I. Direct Blue 199 as a dye component dissolved at a concentration of 0.0001% by mass, and mixed and stirred for 12 hours at ordinary temperature. Thereafter, the resultant mixture was centrifuged under conditions of 12,000 rpm to separate and collect a dye application inorganic pigment, the thus-collected inorganic pigment was left to stand for 12 hours under an environment of 80° C. to remove water, and the dye applied inorganic pigment was powdered in a mortar. The thus-obtained dye applied powder (0.1 g) was subjected to a scattering reflectance spectrometer (product name: U-4000, manufactured by Hitachi Ltd.) to find the spectral intensity at an absorption wavelength of 610 nm, thereby making evaluation of coloring material adsorbability. The results are shown in Table 3.

(Evaluation of Ozone Resistance)

The coloring material applied sample (0.05 g) obtained in the evaluation of coloring material application property was left to stand for 4 hours in a container containing ozone gas at a concentration of 10 ppm. Thereafter, the coloring density of the coloring material was measured by means of a scattering reflectance spectrometer (product name: U-4000, manufactured by Hitachi Ltd.) to find the retention of the applied coloring material from the spectral intensity at an absorption wavelength of 610 nm. The results are shown in Table 3.

TABLE 3

| | Evaluation of coloring material application property | | |
|---|---|---|---|
| | Spectral intensity at $\lambda = 610$ nm | Spectral intensity at $\lambda = 670$ nm | Evaluation of ozone resistance Retention (%) |
| Ex. C-1 | 450 | 452 | 112% |
| Ex. C-2 | 465 | 461 | 101% |
| Comp. Ex. A-1 | 325 | 354 | 85% |
| Comp. Ex. A-2 | 326 | 363 | 88% |
| Comp. Ex. A-3 | 296 | 321 | 83% |
| Comp. Ex. A-4 | 407 | 422 | 65% |
| Comp. Ex. A-5 | 416 | 432 | 67% |
| Comp. Ex. A-6 | 377 | 391 | 73% |
| Comp. Ex. A-7 | 405 | 416 | 84% |
| Comp. Ex. A-8 | 396 | 412 | 71% |
| Comp. Ex. A-9 | 384 | 396 | 75% |

The surface-modified inorganic pigment of Example C-1 was washed to prepare a sample. The washing was conducted by a method in which the pigment is dispersed in pure water so as to give a solid content concentration of 10%, and the resultant dispersion was stirred for 1 hour and then centrifuged under conditions of 12,000 rpm to conduct solid-liquid separation, thereby collecting solids. Incidentally, the pigment was washed by conducting this process three times.

In order to study the surface condition of the sample obtained above, the presence of an amorphous body was studied by an X-ray diffraction (XRD) method using CuKα manufactured by Rigaku Co. With respect to measuring conditions, the range of measuring 2θ (A) was from 2° to 50°. A peak indicating crystallinity derived from magnesium acetate (divalent or higher-valent metal and anion component) could not be observed at 2θ of a little less than 10° even in the washed sample. As a result of an X-ray photoelectron spectroscopy (XPS) as conducted, the positions of peaks caused by bondings of 2p of Al making up the surface-modified inorganic pigment, 1s of oxygen and 1s of carbon were not different. Accordingly, in the above sample, in which the presence of the amorphous body could be identified, it is concluded that the inorganic pigment and amorphous body contained in the surface-modified inorganic pigment do not chemically bond to each other. With respect to the resultant sample, the acid point intensity was proved by a temperature programmed desorption test (TPD) that studies the surface activity by using ammonia gas. As a result, the same results as 'b' illustrated in FIGS. 15 and 16 were obtained, and no acid point could be identified. In other words, this sample is also a surface-modified inorganic pigment according to the present invention.

Coloring material application property was then evaluated. The evaluation of coloring material application property is as follows. The sample (1.5 g) obtained in the above-described manner was added to an aqueous solution of the cyan dye disclosed in WO 2004/087815 as a dye component dissolved at a concentration of 0.0001% by mass, and mixed and stirred for 12 hours at ordinary temperature. Thereafter, the resultant mixture was centrifuged under conditions of 12,000 rpm to separate and collect a dye applied inorganic pigment, the thus-collected inorganic pigment was left to stand for 12 hours under an environment of 80° C. to remove water, and the dye applied inorganic pigment was powdered in a mortar. The thus-obtained dye applied powder (0.1 g) was subjected to a diffuse reflectance spectrometer (product name: U-4000, manufactured by Hitachi Ltd.) to find the spectral intensity at an absorption wavelength of 610 nm, thereby making evaluation of coloring material adsorbability to compare it with the surface-unmodified inorganic pigment of Comparative Example A-4. As a result, it could be confirmed that the spectral intensity at λ=610 nm of the sample obtained by washing the surface-modified inorganic pigment of Example C-1 was high. In other words, it was found that the sample obtained by washing the surface-modified inorganic pigment of Example C-1 is also higher in dye adsorbability than the surface-unmodified inorganic pigment (Comparative Example A-4).

The ozone resistance was then evaluated. The evaluation of the ozone resistance is as follows. The coloring material applied sample (0.05 g) obtained in the evaluation of coloring material application property was left to stand for 12 hours in a container containing ozone gas at a concentration of 10 ppm. Thereafter, the coloring density of the coloring material was measured by means of a scattering reflectance spectrometer (product name: U-4000, manufactured by Hitachi Ltd.) to find the retention of the applied coloring material from the spectral intensity at an absorption wavelength of 610 nm. As a result, it was found that the retention in the surface-unmodified inorganic pigment (Comparative Example A-4) was 90%, whereas the retention in the sample obtained by washing the surface-modified inorganic pigment of Example C-1 was 103%, and the sample was scarcely faded.

From these results, it was clarified that the surface-modified inorganic pigment (Example C-1) prior to the preparation of the above sample is "a surface-modified inorganic pigment which includes an inorganic pigment having acid function and an amorphous body which is located on the surface of the inorganic pigment having acid function and is formed by at least a divalent or higher-valent metal and an anion component in a state where the inorganic pigment and the amorphous body do not chemically bond to each other, wherein the amorphous body includes an amorphous body dissolved in water and an amorphous body remaining on the surface of the inorganic pigment without being dissolved in water, and the surface-modified inorganic pigment does not exhibit acid function".

Example D-1

An operation was conducted in the same manner as in Example B-3 except that calcium acetate was used in place of magnesium acetate tetrahydrate in the mixture-preparing step B, thereby obtaining a mixture (D) as a sample for Example D-1.

The resultant mixture (D) was observed by X-ray diffraction. As a result, a broad peak indicating the presence of an amorphous body was identified at low angles.

As a result of an X-ray photoelectron spectroscopy (XPS) as conducted, the positions of peaks caused by bondings of 2p of Al making up the surface-modified inorganic pigment, 1s of oxygen and 1s of carbon and profile forms were not different, and the surface conditions were not different. Accordingly, in the above sample, in which the presence of the amorphous body could be identified, it is concluded that the inorganic pigment and amorphous body contained in the surface-modified inorganic pigment do not chemically bond to each other.

Example E-1

An operation was conducted in the same manner as in Example B-3 except that magnesium sulfate hydrate was used in place of magnesium acetate tetrahydrate in the mixture-preparing step B, thereby obtaining a mixture (E) as a sample for Example E-1.

The resultant mixture (E) was observed by X-ray diffraction. As a result, a broad peak indicating the presence of an amorphous body was identified at low angles.

As a result of an X-ray photoelectron spectroscopy (XPS) as conducted, the positions of peaks caused by bondings of 2p of Al making up the surface-modified inorganic pigment, 1s of oxygen and 1s of carbon were not different, and the surface conditions were not different. Accordingly, in the above sample, in which the presence of the amorphous body could be identified, it is concluded that the inorganic pigment and amorphous body contained in the surface-modified inorganic pigment do not chemically bond to each other.

Example F-1

An operation was conducted in the same manner as in Example B-3 except that magnesium nitrate hexahydrate was used in place of magnesium acetate tetrahydrate in the mixture-preparing step B, thereby obtaining a mixture (F) as a sample for Example F-1.

The resultant mixture (F) was observed by X-ray diffraction in the same manner as the surface observation A of mixture. As a result, a broad peak indicating the presence of an amorphous body was identified at low angles. As a result of an X-ray photoelectron spectroscopy (XPS) as conducted, the positions of peaks caused by bondings of 2p of Al making up the surface-modified inorganic pigment, 1s of oxygen and is of carbon were not different, and the surface conditions were not different. Accordingly, in the above sample, in which the presence of the amorphous body could be identified, it is concluded that the inorganic pigment and amorphous body contained in the surface-modified inorganic pigment do not chemically bond to each other.

Example G-1

An operation was conducted in the same manner as in Example B-3 except that lanthanum acetate hydrate was used in place of magnesium acetate tetrahydrate in the mixture-preparing step B, thereby obtaining a mixture (G) as a sample for Example G-1.

The resultant mixture (G) was observed by X-ray diffraction. As a result, a broad peak indicating the presence of an amorphous body was identified at low angles.

As a result of an X-ray photoelectron spectroscopy (XPS) as conducted, the positions of peaks caused by bondings of 2p of Al making up the surface-modified inorganic pigment, 1s of oxygen and is of carbon were not different, and the surface conditions were not different. Accordingly, in the above sample, in which the presence of the amorphous body could be identified, it is concluded that the inorganic pigment and amorphous body contained in the surface-modified inorganic pigment do not chemically bond to each other.

Example H-1

An operation was conducted in the same manner as in Example B-3 except that strontium acetate hemihydrate was used in place of magnesium acetate tetrahydrate in the mixture-preparing step B, thereby obtaining a mixture (H) as a sample for Example H-1.

The resultant mixture (H) was observed by X-ray diffraction. As a result, a broad peak indicating the presence of an amorphous body was identified at low angles.

As a result of an X-ray photoelectron spectroscopy (XPS) as conducted, the positions of peaks caused by bondings of 2p of Al making up the surface-modified inorganic pigment, 1s of oxygen and is of carbon were not different, and the surface conditions were not different. Accordingly, in the above sample, in which the presence of the amorphous body could be identified, it is concluded that the inorganic pigment and amorphous body contained in the surface-modified inorganic pigment do not chemically bond to each other.
(Evaluation of Ozone Resistance)

Each of the samples (1.5 g) obtained in Examples B-3, D-1, E-1, F-1 and H-1, and Comparative Example B-4 was added to an aqueous solution of C.I. Direct Blue 199 as a dye component dissolved at a concentration of 0.0001% by mass, and mixed and stirred for 12 hours at ordinary temperature. Thereafter, the resultant mixture was centrifuged under conditions of 12,000 rpm to separate and collect a dye application inorganic pigment. The dye applied inorganic pigment was then left to stand for 12 hours under an environment of 80° C. to remove water, and powdered in a mortar. The thus-obtained dye applied powder sample (0.1 g) was left to stand for 4 hours in a container containing ozone gas at a concentration of 10 ppm to visually evaluate change of the colored dye by exposure to ozone. The conditions thereof are shown collectively in FIG. 19.

From FIG. 19, the surface-modified inorganic pigments of Examples B-3, D-1, E-1, F-1 and H-1 are less in change of coloring material density before and after exposure to ozone compared with the surface-unmodified inorganic pigments of Comparative Example B-4. Example G-1 is also less in change of coloring material density before and after exposure to ozone compared with Comparative Example B-4. Among Examples, Example B-3 is particularly a little in change of coloring material density.
Investigation on Mixture (M) of Silica and Magnesium Acetate Tetrahydrate
(Mixture-Preparing Step J: Preparation of Surface-Modified Inorganic Pigment Sample Precursor)

An operation was conducted in the same manner as in the mixture-preparing step A except that a commercially available amorphous silica (trade name: Aerosil 200, product of Nippon Aerosil Co., Ltd.) was used in place of the alumina hydrate in the mixture-preparing step A, thereby obtaining a mixture (M).
(Surface Observation J of Mixture: Observation of Surface Condition of Surface-Modified Inorganic Pigment Sample Precursor)

Example M-1

The mixture (M) was put in a crucible which was then put in an oven of 200° C. for 2 hours to bake the mixture, thereby providing a surface-modified inorganic pigment as a sample for Example M-1. The sample was observed by X-ray diffraction. As a result, a broad peak indicating the presence of an amorphous body was identified at low angles.

As a result of an X-ray photoelectron spectroscopy (XPS) as conducted, the positions of peaks caused by bondings of 2p of Si making up the surface-modified inorganic pigment, 1s of oxygen and is of carbon were not different, and the surface conditions were not different. Accordingly, in the above sample, in which the presence of the amorphous body could be identified, it is concluded that the inorganic pigment and amorphous body contained in the surface-modified inorganic pigment do not chemically bond to each other.

Comparative Example M-1

Silica powder (M) was obtained in the same manner as in Example M-1 except that magnesium acetate tetrahydrate was not added in Example M-1, and this powder was provided as a sample for Comparative Example M-1. The sample was observed by X-ray diffraction. As a result, a broad peak indicating the presence of an amorphous body could not be identified at low angles.
(Evaluation of Ozone Resistance)

Each of the samples (1.5 g) obtained in Example M-1 and Comparative Example M-1 was added to an aqueous solution of C.I. Direct Blue 199 as a dye component dissolved at a concentration of 0.0001% by mass, and mixed and stirred for 12 hours at ordinary temperature. Thereafter, the resultant mixture was centrifuged under conditions of 12,000 rpm to separate and collect a dye application inorganic pigment. The dye applied inorganic pigment was then left to stand for 12 hours under an environment of 80° C. to remove water, and powdered in a mortar. The thus-obtained dye applied powder sample (0.1 g) was left to stand for 4 hours in a container containing ozone gas at a concentration of 10 ppm to visually evaluate change of the colored dye by exposure to ozone. The results are shown collectively in FIG. 20. The sample of Example M-1 is remarkably high in retained density after the exposure to ozone.

Recording media are then evaluated.

Example 1

A surface-modified inorganic pigment dispersion containing the surface-modified inorganic pigment obtained in Example C-1 at a solid content concentration of 6% by mass was first prepared. Polyvinyl alcohol, PVA117 (trade name, product of Kuraray Co., Ltd.), was then dissolved in pure water to obtain a 9% by mass aqueous solution. A 3% by mass aqueous solution of boric acid was then added into the surface-modified inorganic pigment dispersion in such a manner that the content of boric acid amounts to 0.50% by mass, in terms of solid content, based on the surface-modified inorganic pigment. Thereafter, the thus-obtained boric acid-containing surface-modified inorganic pigment dispersion and the aqueous solution of polyvinyl alcohol previously prepared were mixed by a static mixer so as to give a mass ratio of the surface-modified inorganic pigment to polyvinyl alcohol of 100:8 in terms of solid content. A white polyethylene terephthalate (PET) film having a thickness of 100 μm was then die-coated with the resultant mixed dispersion so as to give a dry coating weight of 30 g/m². The PET film coated with the mixed dispersion was dried at 100° C. to produce a recording medium N of Example 1.

Example 2

A surface-modified inorganic pigment of Example 2 was prepared in the same manner as in Example C-1 except that magnesium acetate tetrahydrate in Example 1 was changed to magnesium nitrate hexahydrate. The thus-prepared surface-modified inorganic pigment was observed by an X-ray diffraction system. As a result, a broad peak indicating the presence of an amorphous body derived from magnesium nitrate was identified. As a result of an X-ray photoelectron spectroscopy (XPS) as conducted, the positions of peaks caused by bondings of 2p of Si making up the inorganic pigment, 1s of oxygen and is of carbon were not different, and the surface conditions were not different. Accordingly, it is concluded that the inorganic pigment and amorphous body contained in the surface-modified inorganic pigment do not chemically bond to each other.

The resultant surface-modified inorganic pigment was then used to produce a recording medium P of Example 2 in the same manner as in Example 1.

Example 3

A surface-modified inorganic pigment of Example 3 was prepared in the same manner as in Example C-1 except that magnesium acetate tetrahydrate in Example 1 was changed to magnesium chloride hexahydrate. The thus-prepared surface-modified inorganic pigment was observed by an X-ray diffraction system. As a result, a broad peak indicating the presence of an amorphous body derived from magnesium chloride was identified. As a result of an X-ray photoelectron spectroscopy (XPS) as conducted, the positions of peaks caused by bondings of 2p of Si making up the inorganic pigment, 1s of oxygen and is of carbon were not different, and the surface conditions were not different. Accordingly, it is concluded that the inorganic pigment and amorphous body contained in the surface-modified inorganic pigment do not chemically bond to each other. The resultant surface-modified inorganic pigment was then used to produce a recording medium Q of Example 3 in the same manner as in Example 1.

Example 4

A surface-modified inorganic pigment of Example 4 was prepared in the same manner as in Example C-1 except that magnesium acetate tetrahydrate in Example 1 was changed to barium acetate. The thus-prepared surface-modified inorganic pigment was observed by an X-ray diffraction system. As a result, a broad peak indicating the presence of an amorphous body derived from barium acetate was identified. As a result of an X-ray photoelectron spectroscopy (XPS) as conducted, the positions of peaks caused by bondings of 2p of Si making up the inorganic pigment, 1s of oxygen and is of carbon were not different, and the surface conditions were not different. Accordingly, it is concluded that the inorganic pigment and amorphous body contained in the surface-modified inorganic pigment do not chemically bond to each other.

The resultant surface-modified inorganic pigment was then used to produce a recording medium R of Example 4 in the same manner as in Example 1.

Example 5

A surface-modified inorganic pigment of Example 5 was prepared in the same manner as in Example C-1 except that magnesium acetate tetrahydrate used in the preparation of the mixture (C) was changed to lanthanum acetate sesquihydrate. The thus-prepared surface-modified inorganic pigment was observed by an X-ray diffraction system. As a result, a broad peak indicating the presence of an amorphous body derived from lanthanum acetate was identified. As a result of an X-ray photoelectron spectroscopy (XPS) as conducted, the positions of peaks caused by bondings of 2p of Si making up the inorganic pigment, 1s of oxygen and 1s of carbon were not different, and the surface conditions were not different. Accordingly, it is concluded that the inorganic pigment and amorphous body contained in the surface-modified inorganic pigment do not chemically bond to each other.

The resultant surface-modified inorganic pigment was then used to produce a recording medium S of Example 5 in the same manner as in Example 1.

Example 6

A recording medium X of Example 6 was produced in the same manner as in Example 1 except that the surface-modified inorganic pigment of Example C-1 used in Example 1 was changed to the surface-modified inorganic pigment of Example C-2.

Comparative Example 1

A recording medium T of Comparative Example 1 was produced in the same manner as in Example 1 except that the surface-modified inorganic pigment of Example C-1 used in Example 1 was changed to the alumina hydrate powder of Comparative Example A-4.

Comparative Example 2

A dispersion of alumina hydrate powder containing the alumina hydrate powder obtained in Comparative Example A-4 at a solid content concentration of 6% by mass was first prepared. Polyvinyl alcohol, PVA117 (trade name, product of Kuraray Co., Ltd.), was then dissolved in pure water to obtain a 9% by mass aqueous solution. A 3% by mass solution of boric acid was then added into the dispersion of the alumina hydrate powder in such a manner that the content of boric acid amounts to 0.50% by mass, in terms of solid content, based on the alumina hydrate powder. Thereafter, the thus-obtained boric-acid-containing dispersion of the alumina hydrate powder and the aqueous solution of polyvinyl alcohol previously prepared were mixed by a static mixer so as to give a mass ratio of the alumina hydrate powder to polyvinyl alcohol of 100:8 in terms of solid content. A white polyethylene terephthalate (PET) film having a thickness of 100 μm was then die-coated with the resultant mixed dispersion so as to give a dry coating weight of 30 g/m². The PET film coated with the mixed dispersion was dried at 100° C. to produce a recording medium U.

The surface of the recording medium U, on which the mixed dispersion had been coated, was then die-coated with a 5% by mass aqueous solution of magnesium acetate tetrahydrate in such a manner that the molar ratio (Mg/Al) of Mg to Al of the alumina hydrate in the mixed dispersion coated is 0.017. The recording medium coated with the aqueous solution of magnesium acetate was then dried to produce a recording medium V of Comparative Example 2.

Comparative Example 3

A recording medium T of Comparative Example 3 was produced in the same manner as in Example 1 except that the surface-modified inorganic pigment of Example C-1 used in Example 1 was changed to a surface-modified inorganic pigment obtained by baking the mixture (C) put in a crucible for 2 hours in an oven of 210° C. As apparent from FIG. 12, a broad peak derived from magnesium acetate could not be identified in the surface-modified inorganic pigment used.

Comparative Example 4

A dispersion containing alumina hydrate at a solid content concentration of 6% by mass and magnesium acetate tetrahydrate at a proportion of 5% by mass based on the alumina hydrate was first prepared. Polyvinyl alcohol, PVA117 (trade name, product of Kuraray Co., Ltd.) was then dissolved in pure water to obtain a 9% by mass aqueous solution. A 3% by mass aqueous solution of boric acid was then added into the dispersion in such a manner that the content of boric acid amounts to 0.50% by mass, in terms of solid content, based on the alumina hydrate. Thereafter, the thus-obtained boric acid-containing dispersion and the aqueous solution of polyvinyl alcohol previously prepared were mixed by a static mixer so as to give a mass ratio of the alumina hydrate to polyvinyl alcohol of 100:8 in terms of solid content. A white polyethylene terephthalate (PET) film having a thickness of 100 μm was then die-coated with the resultant mixed dispersion so as to give a dry coating weight of 30 g/m². The PET film coated with the mixed dispersion was dried at 100° C. to produce a recording medium W of Comparative Example 4.

Examples 1 to 6, and Comparative Examples 1 to 4 were evaluated as follows.
(Condition of Amorphous Body)

With respect to the recording media obtained above, the presence of the amorphous body was identified by the X-ray diffraction (XRD) method using CuKα as a radiation source. In Example 1, the amorphous body derived from magnesium acetate could be identified. In Examples 2 to 6 as well, the amorphous bodies derived from the divalent or higher-valent metal and anion component used in the respective Examples could be identified. On the other hand, in the recording media of Comparative Examples, no amorphous body could be identified.

(Analysis of Bonding State)

With respect to the recording media obtained above, the bonding state on the surface of each recording medium was analyzed by change of the position of an Al 2p peak obtained by observing the state of an Al element by the X-ray photoelectron spectroscopy (XPS). In Examples 1 to 6, no shift of binding energy could be identified. Accordingly, in the above samples, in which the presence of the amorphous body could be identified, it is concluded that the inorganic pigment and amorphous body contained in the surface-modified inorganic pigment do not chemically bond to each other.

The recording media of Examples 1 to 6 and Comparative Examples 1 to 4 were evaluated as to the following respective items, and the results are shown in Tables 4 and 5.
A) Image Preservability of Recorded Article
<Production of Recorded Article>

Images were printed on the recording surface of each of the recording media produced in Examples 1 to 6 and Comparative Examples 1 to 4 by means of a photo printer (trade name: PIXUS iP8600, ink: BCI-7, manufacture by Canon Inc.) using an ink-jet system to produce a recorded article. The images printed were single-color patches of black, cyan, magenta and yellow colors and were printed so as to have an optical density (OD) of almost 1.0. The thus-produced recorded article was used in the following tests.
<Gas Resistance Test>

An ozone exposure tester (manufactured by SUGA TEST INSTRUMENTS CO., LTD., trade name: Ozone Weatherometer) was used to conduct an ozone exposure test.
(Testing Conditions)
Exposing gas composition: ozone 3 ppm
Testing time: 16 hours
Temperature and humidity conditions in testing chamber: 40° C. and 60% RH.
(Evaluating Method of Gas Resistance)

Optical densities of the above-described recorded article before and after the gas resistance test were measured by means of a spectrophotometer, "Spectro Lino" (manufactured by GretagMacbeth Co.) to calculate out the retention of the optical density according to the following equation, thereby evaluating the recorded article as to the gas resistance based on the following evaluation standard. The results are shown in Table 4.

Retention (%) of optical density=(Optical density after test/Optical density before test)×100.

(Evaluation Standard)
A: Retention of optical density is 75% or more;
B: Retention of optical density is 55% or more and less then 75%;
C: Retention of optical density is less than 55%.

TABLE 4

|  | Black | Cyan | Magenta | Yellow |
|---|---|---|---|---|
| Ex. 1 | A | A | A | B |
| Ex. 2 | A | A | A | B |
| Ex. 3 | A | A | A | B |
| Ex. 4 | A | A | A | B |
| Ex. 5 | A | A | A | B |
| Ex. 6 | A | A | A | B |
| Comp. Ex. 1 | B | B | A | C |
| Comp. Ex. 2 | B | B | A | B |
| Comp. Ex. 3 | B | B | A | B |
| Comp. Ex. 4 | B | B | A | C |

From the results of Table 4, it was revealed that the recording media of Examples are better in gas resistance than the recording media of Comparative Examples.

<Light Resistance Test>

The above-described recorded article was subjected to an exposure test by means of Low-Temperature Cycle Xenon Weatherometer XL-75C (trade name, manufactured by SUGA TEST INSTRUMENTS CO., LTD.).

(Testing Conditions)
Irradiation intensity: 100 kLux
Testing period: 1 week
Temperature and humidity conditions in testing chamber: 23° C. and 55% RH.

(Evaluating Method of Light Resistance)

Optical densities of the above-described recorded article before and after the light resistance test were measured by means of a spectrophotometer, "Spectro Lino" (manufactured by GretagMacbeth Co.) to calculate out the retention of the optical density according to the following equation, thereby evaluating the recorded article as to the light resistance based on the following evaluation standard. The results are shown in Table 5.

Retention (%) of optical density=(Optical density after test/Optical density before test)×100.

Evaluation Standard:
A: Retention of optical density is 75% or more;
B: Retention of optical density is 55% or more and less then 75%;
C: Retention of optical density is less than 55%.

TABLE 5

|  | Black | Cyan | Magenta | Yellow |
|---|---|---|---|---|
| Ex. 1 | A | A | A | B |
| Ex. 2 | A | A | A | B |
| Ex. 3 | A | A | A | B |
| Ex. 4 | A | A | A | B |
| Ex. 5 | A | A | A | B |
| Ex. 6 | A | A | A | B |
| Comp. Ex. 1 | B | B | A | C |
| Comp. Ex. 2 | B | B | A | C |
| Comp. Ex. 3 | B | B | A | C |
| Comp. Ex. 4 | B | B | A | C |

From the results of Table 5, it was known that the recording media of Examples are better in light resistance than the recording media of Comparative Examples.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-340897, filed Dec. 28, 2007, which is hereby incorporated by reference in its entirety.

The invention claimed is:

1. A recording medium comprising:
   a substrate; and
   a coloring-material-receiving layer which is formed on the substrate and which contains an inorganic pigment,
   wherein the inorganic pigment is a surface-modified inorganic pigment comprising (a) an inorganic pigment having acid function and (b) an amorphous body located on a surface of the inorganic pigment having acid function and formed by at least a divalent or higher-valent metal and an anion component in a state where the inorganic pigment having acid function and the amorphous body do not chemically bond to each other, and
   wherein the surface-modified inorganic pigment does not exhibit acid function.

2. The recording medium according to claim 1, wherein the inorganic pigment having acid function is a porous alumina hydrate.

3. The recording medium according to claim 1, wherein the inorganic pigment having acid function is a bifunctional inorganic pigment.

4. The recording medium according to claim 3, wherein the inorganic pigment having acid function is alumina hydrate.

5. The recording medium according to claim 1, wherein the divalent or higher-valent metal is an alkaline earth metal.

6. The recording medium according to claim 1, wherein the amorphous body is an amorphous body formed by the divalent or higher-valent metal, the anion component, and a water molecule.

7. The recording medium according to claim 1, wherein the content of the surface-modified inorganic pigment in the coloring-material-receiving layer is 50% by mass or more.

8. The recording medium according to claim 1, wherein the content of the surface-modified inorganic pigment in the coloring-material-receiving layer is 70% by mass or more and 99.0% by mass or less.

9. The recording medium according to claim 1, wherein the surface-modified inorganic pigment is obtained through a process comprising the steps of:
   applying a divalent or higher-valent metal salt hydrate to an inorganic pigment having acid function; and
   causing the divalent or higher-valent metal salt hydrate applied to exist in an amorphous state.

10. The recording medium according to claim 9, wherein the amorphous state is formed by applying thermal energy in such a temperature region as to achieve an amorphous state present during the course where the divalent or higher-valent metal salt hydrate applied is crystal-transformed from a monohydrate to an anhydride in the step of causing the divalent or higher-valent metal salt hydrate applied to exist in the amorphous state.

11. The recording medium according to claim 9, wherein the step of applying a divalent or higher-valent metal salt hydrate to an inorganic pigment having acid function is a step of mixing the inorganic pigment having acid function and the divalent or higher-valent metal salt hydrate.

12. The recording medium according to claim 9, wherein the step of causing the divalent or higher-valent metal salt hydrate applied to exist in an amorphous state is a step of baking a mixture containing the inorganic pigment having acid function and the divalent or higher-valent metal salt hydrate using an oven or a spray-drying device.

13. The recording medium according to claim 9, wherein the step of causing the divalent or higher-valent metal salt hydrate applied to exist in an amorphous state is a step of baking a mixture containing the inorganic pigment having acid function and the divalent or higher-valent metal salt hydrate using a spray-drying device.

* * * * *